US006934511B1

(12) United States Patent
Lovinggood et al.

(10) Patent No.: US 6,934,511 B1
(45) Date of Patent: Aug. 23, 2005

(54) INTEGRATED REPEATER

(75) Inventors: Breck W. Lovinggood, Garland, TX (US); Mano D. Judd, Rockwall, TX (US); William P. Kuiper, Lucas, TX (US)

(73) Assignee: Andrew Corporation, Orland Park, IL (US)

( * ) Notice: Subject to any disclaimer, the term of this patent is extended or adjusted under 35 U.S.C. 154(b) by 822 days.

(21) Appl. No.: 09/694,225

(22) Filed: Oct. 23, 2000

Related U.S. Application Data

(63) Continuation-in-part of application No. 09/357,032, filed on Jul. 20, 1999, and a continuation-in-part of application No. 09/483,234, filed on Jan. 14, 2000, and a continuation-in-part of application No. 09/483,649, filed on Jan. 14, 2000.

(51) Int. Cl.⁷ .............................. H04B 1/38; H04M 1/00
(52) U.S. Cl. ...................... 455/11.1; 455/24; 455/63.1; 455/562.1; 343/702; 343/824
(58) Field of Search .................... 455/11.1, 24, 63.1, 455/63.4, 562.1, 67.13, 67.16, 561, 280, 296, 90.1, 90.3; 343/702, 824

(56) References Cited

U.S. PATENT DOCUMENTS

| 3,728,733 | A | | 4/1973 | Robinson ..................... 343/765 |
|---|---|---|---|---|
| 3,731,315 | A | | 5/1973 | Sheleg ......................... 347/854 |
| 3,917,998 | A | * | 11/1975 | Welti ........................... 455/13.1 |
| 4,032,922 | A | | 6/1977 | Provencher .................. 343/854 |
| 4,041,389 | A | | 8/1977 | Oades ............................ 325/3 |
| 4,099,036 | A | | 7/1978 | Migeon ................... 179/170 J |
| 4,189,675 | A | | 2/1980 | Reilly et al. .................... 325/4 |
| 4,198,600 | A | | 4/1980 | Oguchi et al. ................. 455/15 |
| 4,246,585 | A | | 1/1981 | Mailloux ..................... 343/854 |
| 4,301,533 | A | * | 11/1981 | Acampora et al. ........... 370/318 |
| 4,317,217 | A | | 2/1982 | Davidson et al. ............. 455/24 |
| 4,318,104 | A | | 3/1982 | Enein .......................... 343/100 |
| 4,338,605 | A | | 7/1982 | Mims .......................... 343/100 |
| 4,352,202 | A | | 9/1982 | Carney ........................ 455/151 |
| 4,407,001 | A | | 9/1983 | Schmidt ...................... 343/840 |
| 4,446,463 | A | | 5/1984 | Irzinski ........................ 343/371 |
| 4,701,935 | A | | 10/1987 | Namiki .......................... 374/4 |
| 4,727,590 | A | | 2/1988 | Kawano et al. ............... 455/33 |
| 4,777,652 | A | | 10/1988 | Stolarczyk ..................... 455/3 |
| 4,789,993 | A | | 12/1988 | Ryu ............................... 375/4 |
| 4,843,402 | A | | 6/1989 | Clement ...................... 343/758 |
| 4,849,763 | A | | 7/1989 | DuFort ........................ 342/372 |
| 4,849,963 | A | | 7/1989 | Kawano et al. ............... 370/30 |
| 4,879,711 | A | | 11/1989 | Rosen .......................... 370/50 |
| 4,973,971 | A | | 11/1990 | Sinsky et al. ............... 342/373 |
| 4,980,665 | A | | 12/1990 | Schotz .................... 340/310 R |
| 4,994,813 | A | | 2/1991 | Shiramatsu et al. ......... 342/360 |
| 5,019,793 | A | | 5/1991 | McNab ....................... 333/156 |

(Continued)

FOREIGN PATENT DOCUMENTS

| GB | 2286749 A | 8/1996 | ............ H04B/7/08 |
|---|---|---|---|
| WO | WO 97/42720 | 11/1997 | |
| WO | WO 98/11626 | 3/1998 | .......... H01Q/23/00 |

*Primary Examiner*—Nay Maung
*Assistant Examiner*—Edan Orgad
(74) *Attorney, Agent, or Firm*—Wood, Herron & Evans, L.L.P.

(57) ABSTRACT

An integrated repeater includes a housing having opposing sides, a donor antenna mounted on one of the opposing sides, a null antenna mounted on the other of the opposing sides, and repeater electronics mounted in the housing and operatively interconnecting the donor antenna and the null antenna. The repeater electronics include a beamforming arrangement for creating a desired antenna pattern of the donor antenna relative to a base station and a desired antenna pattern of the null antenna relative to subscriber equipment, and interference cancellation electronics for cancelling interference feedback signals between the donor antenna and the null antenna in both an uplink path and a downlink path.

82 Claims, 27 Drawing Sheets

U.S. PATENT DOCUMENTS

| | | | | |
|---|---|---|---|---|
| 5,054,120 A | | 10/1991 | Ushiyama et al. | 455/351 |
| 5,086,302 A | | 2/1992 | Miller | 342/373 |
| 5,089,823 A | | 2/1992 | Vasile | 342/383 |
| 5,115,514 A | | 5/1992 | Leslie | 455/9 |
| 5,128,687 A | | 7/1992 | Fay | 343/754 |
| 5,194,873 A | * | 3/1993 | Sickles, II | 342/374 |
| 5,241,410 A | | 8/1993 | Streck et al. | 359/176 |
| 5,321,412 A | | 6/1994 | Kopp et al. | 343/742 |
| 5,349,694 A | | 9/1994 | Kawano et al. | 455/11.1 |
| 5,351,060 A | | 9/1994 | Bayne | 343/766 |
| 5,392,054 A | | 2/1995 | Bottomley et al. | 343/702 |
| 5,444,864 A | | 8/1995 | Smith | 455/84 |
| 5,463,401 A | | 10/1995 | Iwasaki | 342/359 |
| 5,485,170 A | | 1/1996 | McCarrick | 343/895 |
| 5,486,835 A | | 1/1996 | Hock | 342/359 |
| 5,512,906 A | | 4/1996 | Speciale | 342/375 |
| 5,587,715 A | | 12/1996 | Lewis | 342/357 |
| 5,589,843 A | | 12/1996 | Meredith et al. | 343/820 |
| 5,600,333 A | * | 2/1997 | Justice et al. | 343/713 |
| 5,610,617 A | | 3/1997 | Gans et al. | 342/373 |
| 5,633,647 A | | 5/1997 | Tines | 343/766 |
| 5,663,736 A | | 9/1997 | Webb et al. | 359/17 |
| 5,754,138 A | | 5/1998 | Turcotte et al. | 342/373 |
| 5,754,139 A | | 5/1998 | Turcotte et al. | 342/373 |
| 5,758,287 A | | 5/1998 | Lee et al. | 455/450 |
| 5,767,807 A | | 6/1998 | Pritchett | 342/374 |
| 5,805,113 A | | 9/1998 | Ogino et al. | 343/713 |
| 5,832,365 A | | 11/1998 | Chen et al. | 455/15 |
| 5,835,848 A | | 11/1998 | Bi et al. | 455/24 |
| 5,856,804 A | | 1/1999 | Turcotte et al. | 342/371 |
| 5,937,332 A | | 8/1999 | Karabinis | 455/12.1 |
| 5,943,618 A | | 8/1999 | Jackson et al. | 455/426 |
| 5,963,847 A | | 10/1999 | Ito et al. | 455/17 |
| 6,029,048 A | | 2/2000 | Treatch | 455/7 |
| 6,043,790 A | | 3/2000 | Derneryd et al. | 343/853 |
| 6,049,315 A | | 4/2000 | Meyer | 343/895 |
| 6,078,787 A | | 6/2000 | Schefte et al. | 455/16 |
| 6,115,762 A | | 9/2000 | Bell et al. | 710/62 |
| 6,125,109 A | | 9/2000 | Fuerter | 370/315 |
| 6,128,471 A | | 10/2000 | Quelch et al. | 455/25 |
| 6,128,557 A | | 10/2000 | Fenton et al. | 701/13 |
| 6,133,868 A | * | 10/2000 | Butler et al. | 342/174 |
| 6,157,344 A | | 12/2000 | Bateman et al. | 343/700 MS |
| 6,198,460 B1 | | 3/2001 | Brankovic | 343/879 |
| 6,222,503 B1 | | 4/2001 | Gietema et al. | 343/890 |
| 6,256,484 B1 | | 7/2001 | Conner et al. | 455/137 |
| 6,285,878 B1 | | 9/2001 | Lai | 455/431 |
| 6,348,986 B1 | | 2/2002 | Doucet et al. | 359/172 |

\* cited by examiner

INTEGRATED REPEATER

CROSS-REFERENCE TO RELATED APPLICATION

This application is a continuation-in-part of the following prior U.S. patent applications: Ser. No. 09/357,032, filed Jul. 20, 1999 entitled "Side-to-Side Repeater"; Ser. No. 09/483,234, filed Jan. 14, 2000 entitled "Adaptive Cancellation for Wireless Repeaters" and Ser. No. 09/483,649, filed Jan. 14, 2000 entitled "RF Switched Beam Planar Antenna". The disclosures of these applications are incorporated herein by reference.

U.S. patent application Ser. No. 09/483,649 is a continuation-in-part of U.S. patent application Ser. No. 09/357,032, filed Jul. 20, 1999.

FIELD OF THE INVENTION

This invention is directed to a repeater which is more "user friendly" than any repeater on the market today, and, in addition, which offers a reduction in hardware, installation, and alignment costs for a repeater site.

The invention is applicable to numerous markets where repeaters are used. Some of these applications include Cellular, PCS (Personal Communication Services), $3^{rd}$ Generation PCS, WLL (Wireless Local Loop), SMR (Specialized Mobil Radio), MMDS (Multipoint Multiuser Data Services), WLAN's (Wireless Local Area Network) at 900 MHz and 2400 MHz and Bluetooth (a new protocol/chip set that links user equipment, being developed by Ericsson, IBM, Intel, Nokia and Toshiba).

BACKGROUND OF THE INVENTION

The use of repeaters by wireless service providers is increasing rapidly. Wireless service providers are under constant pressure by their customers to improve and expand coverage while decreasing the cost of service. This conflicts with the pressure from investors and stockholders to increase earnings and decrease expenses. In addition, local zoning and regulatory pressures often limit or preclude placement of base station sites in the optimum locations. Because of these pressures, service providers require cost-effective alternatives to installing additional base stations to expand coverage. The repeater has become a recognized tool to help service providers expand coverage and fill in coverage in null areas without the expense of full base station sites.

The repeater market is highly competitive. Repeater manufactures are under constant pressure from customers and competitors to provide lower cost solutions. Additional pressure results from the base station manufacturers as they add more capability, reduce size, and reduce costs in the base station products.

For a repeater site, the repeater itself represents a significant percentage of the total hardware costs. In addition to the repeater, a typical repeater site includes hardware such as antennas, antenna mounts, coaxial cables, and cable mounting hardware. Since the repeater represents a large percentage of the total hardware costs for a repeater site, it provides the best opportunity for significant cost reductions. However, the hardware costs are only a portion of the total costs of a repeater site. A significant cost is associated with the installation and testing of the repeater. Installation costs are high because of the level of expertise needed to perform the tasks for a repeater site. Some of these tasks include:

mounting and alignment of the donor and null antennas, installation of coaxial cables, grounding, and primary AC power cables, measurement of the donor to null antenna isolation, customization of the antenna installation to improve antenna isolation, alignment of repeater gain to insure stability of the repeater site and compliance with equipment specifications such as output power ratings.

This invention incorporates several concepts to create an integrated repeater that significantly reduces the installation costs for a repeater site. In one embodiment of the invention, the only equipment to install is the repeater itself and the primary AC power cables. In addition, the repeater in this invention contains support software and equipment to allow the repeater to perform antenna alignment and gain set up with only minimal support from technical personnel. This invention, while potentially increasing the repeater hardware costs, results in a reduction of the total cost of a repeater site.

SUMMARY OF THE INVENTION

Briefly, in accordance with the foregoing, an integrated repeater comprises a housing having opposing sides, a donor antenna mounted on one of the opposing sides of said housing; a null antenna mounted on the other of said opposing sides of said housing, repeater electronics mounted in said housing and operatively interconnecting said donor antenna and said null antenna, said donor antenna and said null antenna each comprising an antenna array having a plurality of antenna elements, and a beamforming arrangement for creating a desired antenna pattern of said donor antenna relative to a base station and a desired antenna pattern of said null antenna relative to subscriber equipment.

In accordance with another embodiment of the invention, an integrated repeater comprises a housing having opposing sides, a donor antenna mounted on one of the opposing sides of said housing; a null antenna mounted on the other of said opposing sides of said housing, repeater electronics mounted in said housing and operatively interconnecting said donor antenna and said null antenna, said donor antenna and said null antenna each comprising an antenna array having a plurality of antenna elements, and said repeater electronics an including an interference cancellation circuit for cancelling interference feedback signals between said donor antenna and said null antenna in both an uplink path and a downlink path.

DETAILED DESCRIPTION OF THE ILLUSTRATED EMBODIMENT

Figure 1:
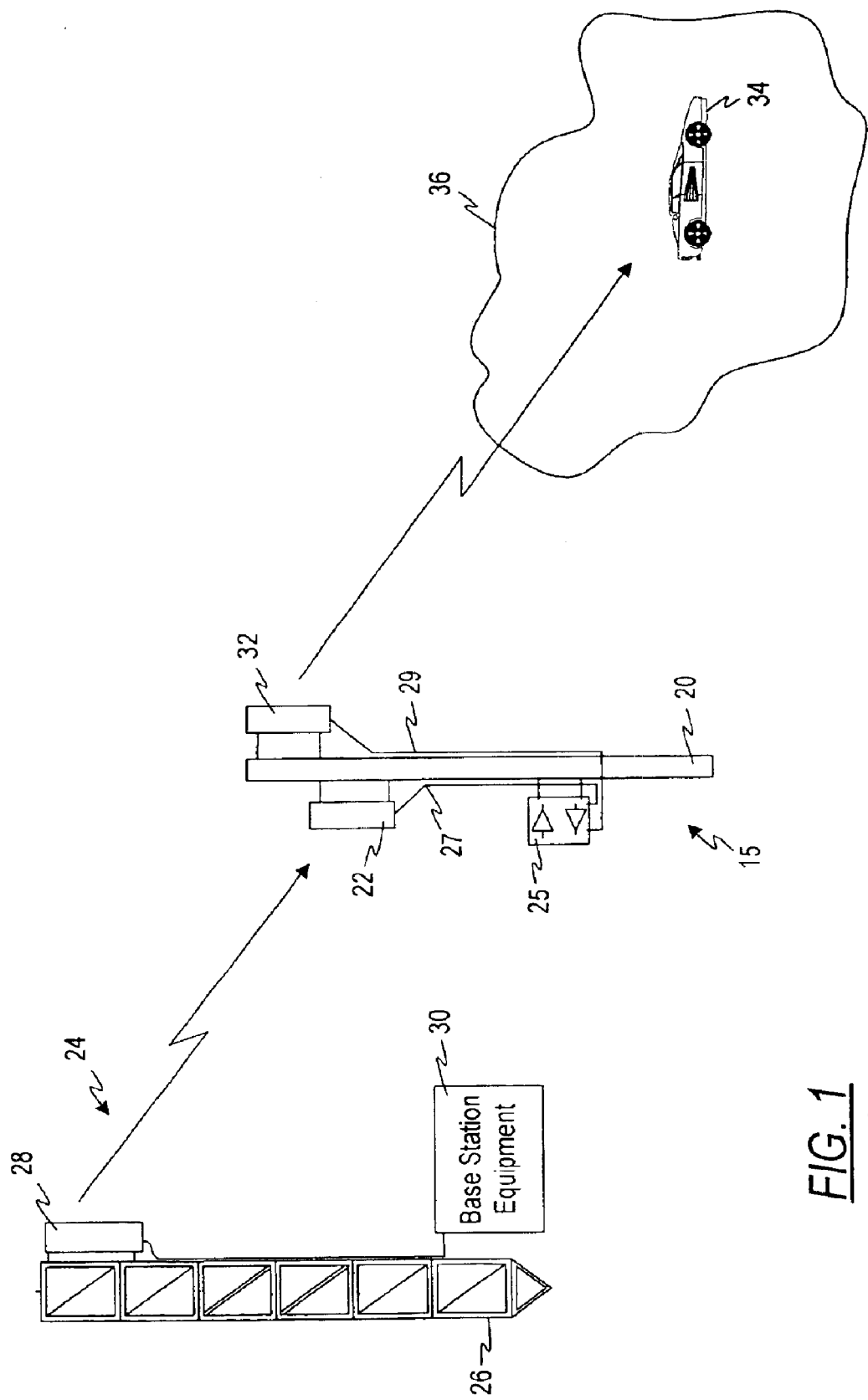
FIG. 1 is a simplified view of a repeater system of the prior art.

Referring initially to FIG. 1, a typical prior art repeater implementation 15 is illustrated. A repeater system resides on a mast or tower 20 and includes a donor antenna 22 for exchanging signals with a base station 24 at a remote location. The base station 24 may include a tower 26, transmit and receive antennas 28 and base station equipment 30.

Referring again to the repeater implementation 15, a second or null antenna 32 exchanges signals with the subscriber which may be a mobile subscriber as illustrated by an automobile at reference numeral 34. The null antenna 32 may be designed, located and installed so as to provide coverage over a null fill area 36, as will be described later herein.

The donor and null antennas 22, 32 are coupled with the repeater electronics 25 which is mounted elsewhere on the mast or tower 20 by runs of coaxial cable 27, 29.

Figure 2:
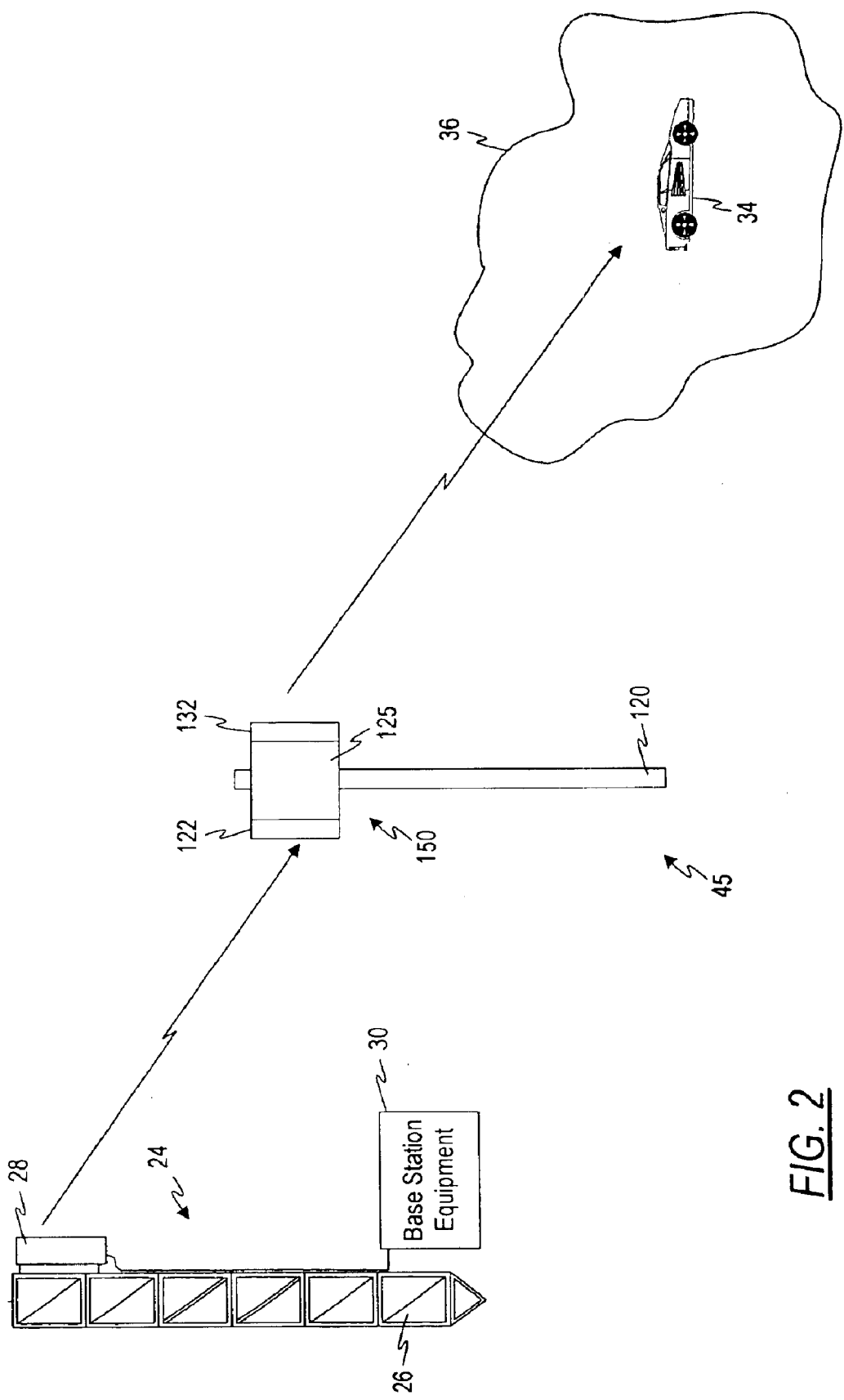
FIG. 2 is a simplified view, in a form similar to FIG. 1, showing a repeater in accordance with one embodiment of the invention.

Referring now to FIG. 2, a repeater implementation in accordance with one embodiment of the invention is designated generally by the reference numeral 45. Similar to the arrangement in FIG. 1, the repeater equipment is mounted to a mast or tower 120 and has a donor antenna 122 and a null antenna 132. Similar to the arrangement in FIG. 1, the donor antenna communicates with antennas 28 at the base station 24 and the null antenna 132 communicates with user equipment which may be a mobile unit 34 with coverage being provided in a null fill area 36. Departing from the prior art, the repeater of the invention comprises an integrated repeater system in which the repeater electronics 125 are incorporated into a single unit or module (see FIG. 3) 150 with the donor and null antennas.

Figure 3:
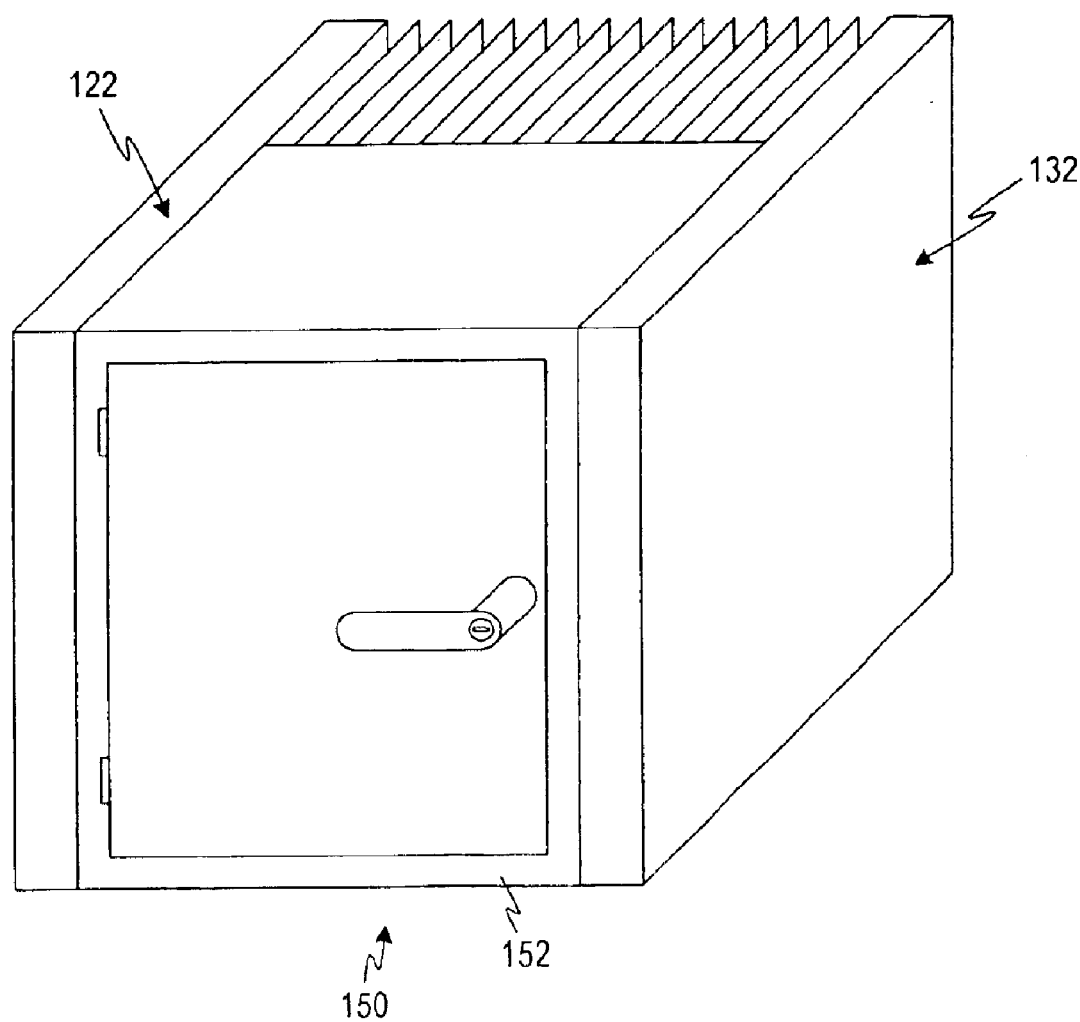
FIG. 3 is a simplified isometric view of a modular repeater in accordance with one aspect of the invention.

A significant way of reducing installation cost is to reduce the amount of equipment that must be installed. A conceptual representation of the integrated repeater 150, as shown in FIG. 3, incorporates the donor antenna 122 and the null antenna 132 into sides of a repeater enclosure 152, such as by using conformal antennas. These antennas are relatively thin flat panels in FIG. 3. This arrangement reduces the installation cost for the separate donor and null antennas and the repeater electronics, and eliminates the coaxial cables shown in the repeater installation in FIG. 1. However, in order to optimally integrate the antennas into the repeater enclosure, several other aspects of this invention come into play.

Figure 4:
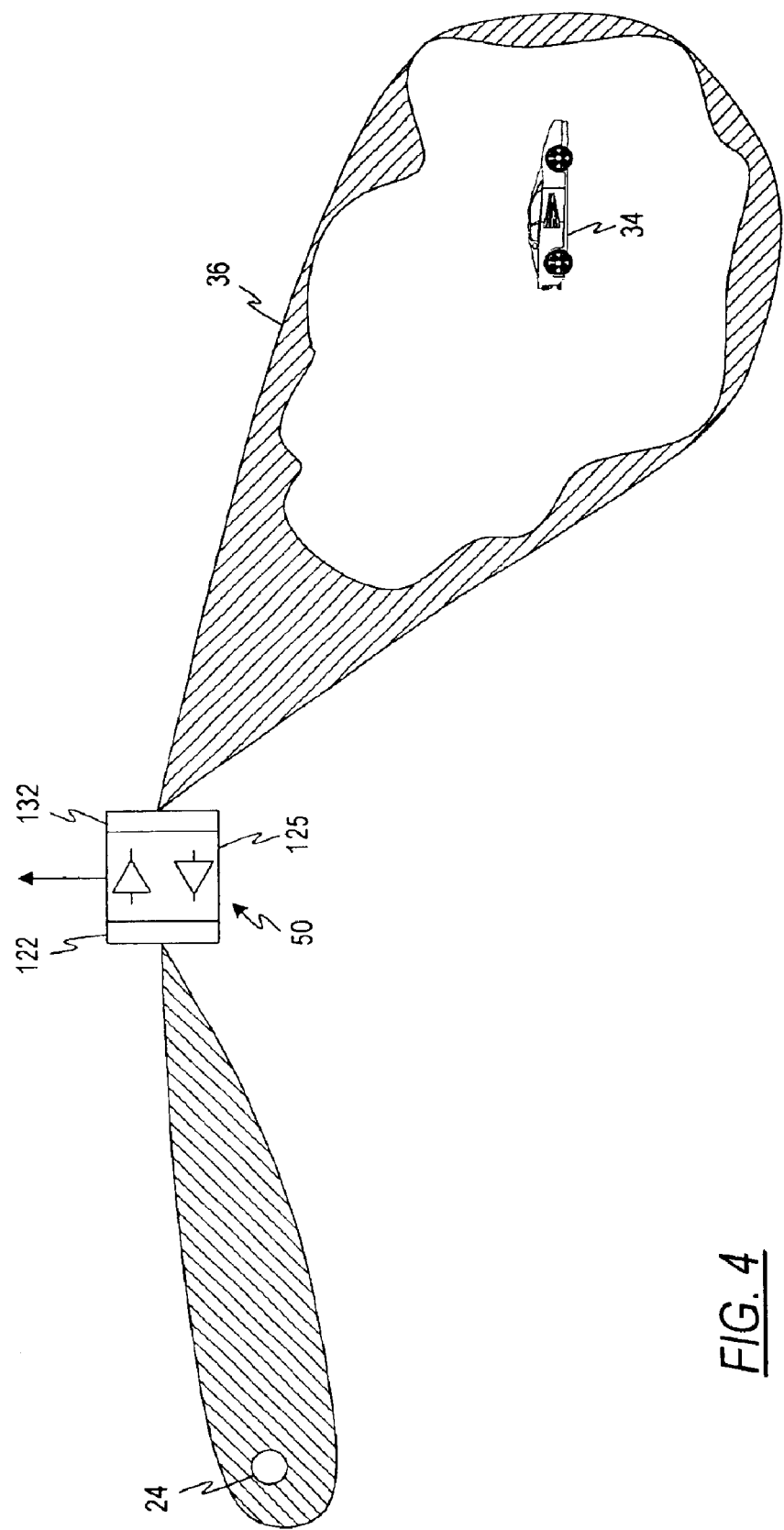
FIG. 4 is a diagrammatic illustration of donor and null antenna steering in an integrated repeater system of the invention.

Often a major challenge for wireless service providers is getting access to an equipment site situated in an optimum location. As shown in FIG. 4, the direction from the donor 122 and null 132 antennas of the repeater to the donor 24, and/or the null, site 36 (i.e., the base station and null fill area) is rarely at a right angle to the face of the donor or null antenna. In fact, this angle will vary significantly from site to site. To address this problem, one embodiment of the invention uses an antenna array with a beamformer network that can be programmed, e.g., from a look-up table. This allows the donor and null antennas to be beam-steered toward the location of the donor and null sites.

Figure 5:
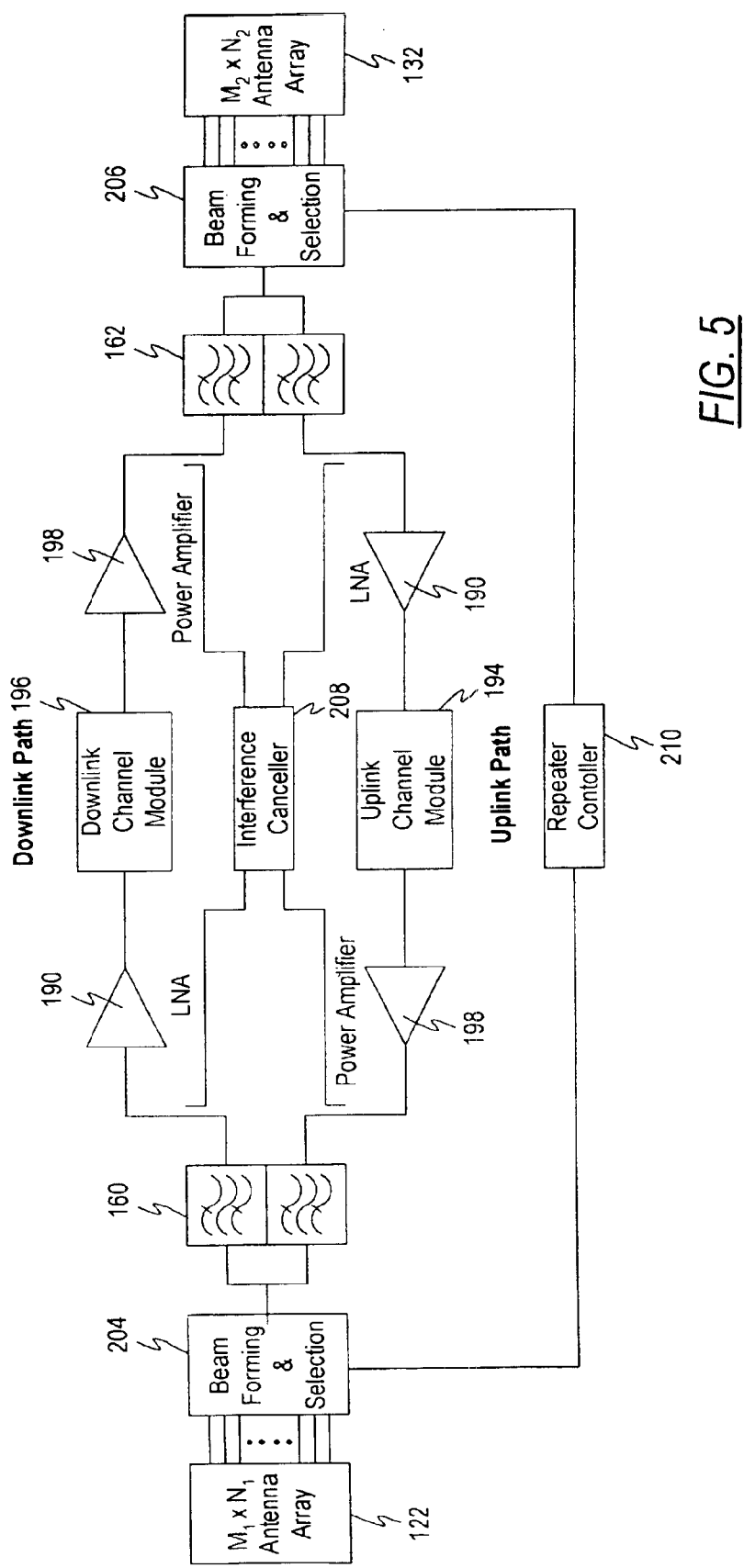
FIG. 5 is a block schematic diagram of one form of a repeater in accordance with the invention, utilizing a duplexed antenna.
Figure 6:
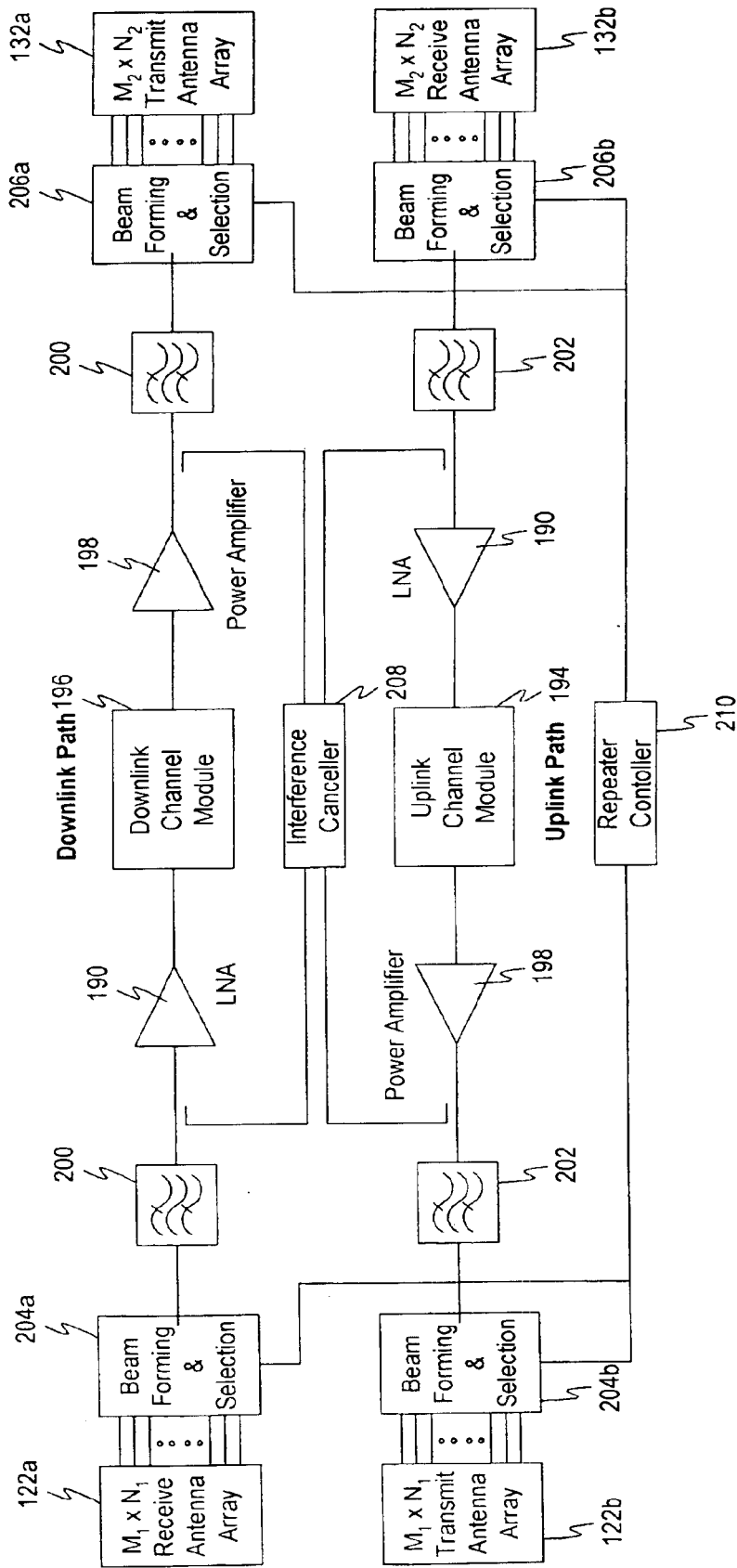
FIG. 6 is a block schematic similar to FIG. 5 in illustrating implementation with separate transmit and receive antennas.

The antennas and beamformer can be implemented in several ways. The block diagrams in FIGS. 5 and 6 show two possible implementations. FIG. 5 is an implementation that uses a common antenna for transmit and receive for each of the donor and null antennas. FIG. 6 shows separate transmit and receive antennas 122a, 122b and 132a, 132b for each of the donor and null antennas. The implementation of FIG. 5 uses duplex filters or diplexers 160, 162 to separate the downlink path and uplink path signals for processing by the repeater. This approach has the advantage that the total area on the side of the integrated repeater 150 can be utilized to accommodate a larger antenna array. However, this approach requires that the filters 160, 162, provide all of the isolation between the downlink path and uplink path of the repeater. FIG. 6 is an implementation that uses separate transmit (132a, 132b) and receive (122a, 122b) antennas. This approach also has the advantage of using the isolation of the two antennas to reduce the filtering requirements in the repeater. However, this approach may increase the area required for the antennas on the sides of the repeater.

The remaining repeater circuits may be implemented in a number of ways. The embodiments shown in FIGS. 5 and 6 use a channel-selective approach. In this approach, a Low Noise Amplifier (LNA) 190 amplifies the low-level signal from each of the antennas, and is a very quiet amplifier to ensure that a good signal-to-noise ratio is maintained in the repeater. After the LNA 190, the desired signal moves to a channel module, comprising an uplink channel module 194 in the uplink path and a downlink channel module 196 in the downlink path. In the channel module, the desired signal is downconverted to a lower intermediate frequency and filtered to limit the spectrum amplified by the repeater to a single channel or set of channels. The intermediate frequency is then upconverted back to the original frequency of the desired signal. The output signal of the channel module is then routed to a power amplifier 198 in each path to create a high level transmit signal. In FIG. 6, respective filters 200, 202 are provided between the LNA's and Power Amplifiers and associated beamforming and selection circuits 204, 206 (to be described below) for the donor and null antennas.

The invention could use a direct RF, offset RF, or DSP, or GPS based repeater instead of the above-described channel-selective approach. Examples of DSP and GPS repeaters are shown respectively in copending U.S. patent application Ser. No. 09/460,023, filed Dec. 13, 1999 and Ser. No. 09/513,543, filed Feb. 25, 2000, which are incorporated herein by reference. A direct RF repeater performs all gain and filtering functions at the high frequency of the desired signal. An offset RF or frequency translating repeater is similar to a channel-selective repeater except that the upconversion of the intermediate frequency moves the signal to a new high frequency signal instead of the original frequency of the desired signal. This approach will minimize or eliminate the need for an interference canceller. A DSP repeater will still utilize an LNA and Power Amplifier but the processing functions in the channel module are handled by digitizing the desired signal, performing the function digitally and then converting the digital signal back to an analog signal.

Figure 7:
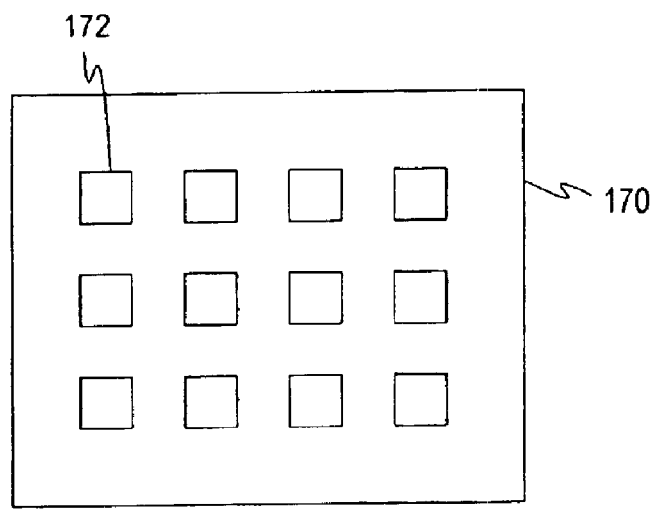
FIG. 7 is a simplified illustration of a patch antenna array.
Figure 8:
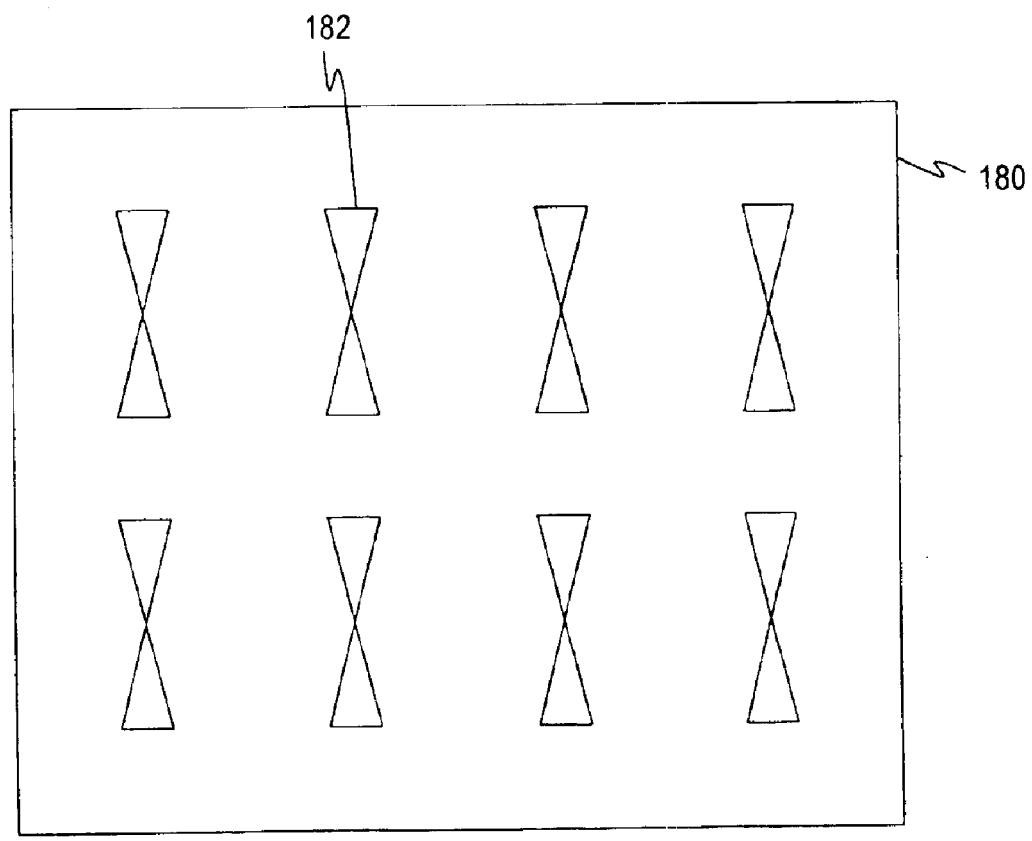
FIG. 8 is a simplified representation, in a form similar to FIG. 7, of a dipole antenna array.

As shown in FIGS. 7 and 8, the donor and null antennas can be implemented using antenna arrays 170,180. Each antenna array uses a row of M horizontally spaced elements to achieve the desired azimuth beamwidth and N vertically spaced rows of elements to achieve the desire elevation beamwidth. This invention may use many different types of antenna elements in the antenna array. Some examples include patch antennas 172 (FIG. 7) and bow tie dipoles 182 (FIG. 8). FIG. 7 is an example of a patch antenna array 170 with M=4 and N=3. FIG. 8 is an example of a bow tie dipole array 180 with M=4 and N=2.

The beamforming and selection networks 204, 206 and 204a, 204b, 206a, 206b in FIGS. 5 and 6, combine the antenna elements 172 or 182 in the antenna array 170 or 180 with appropriate phase and amplitude to create the desired antenna pattern. Several methods can be used to implement the beamforming and selection networks. One method of implementing this is to use a M×N Butler matrix to perform the phasing and combining functions. The angle and elevation of each beam would be stored in a look-up table that the repeater uses to drive a diode or relay switch matrix to select the desired beam. This look-up table would be stored in a memory of the repeater controller 210 in order to map the desired azimuth and program other parameters and matrix settings for use by the Butler matrix.

The above-referenced co-pending application Ser. No. 09/483,649, filed Jan. 14, 2000 describes implementations of beamforming for array antennas using a Butler Matrix approach, which might be utilized in this regard.

Figure 18:
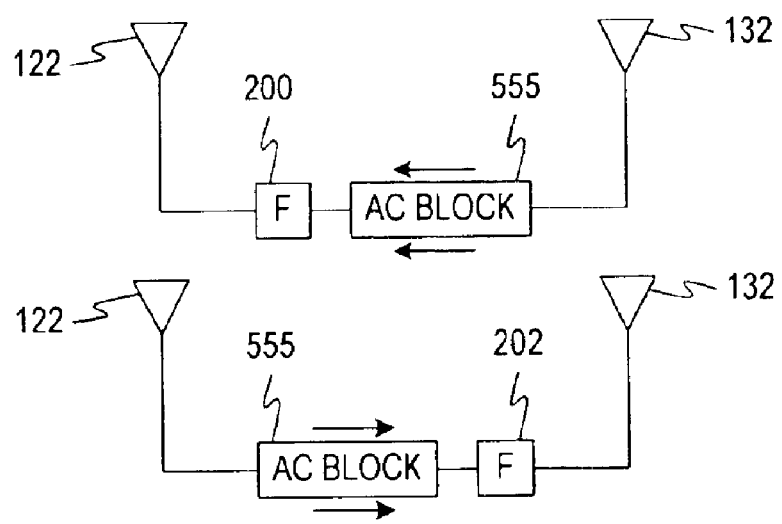
FIG. 18 is a block schematic diagram of a form of a repeater similar to that in FIG. 5, but without uplink and downlink channel modules.
Figure 19:
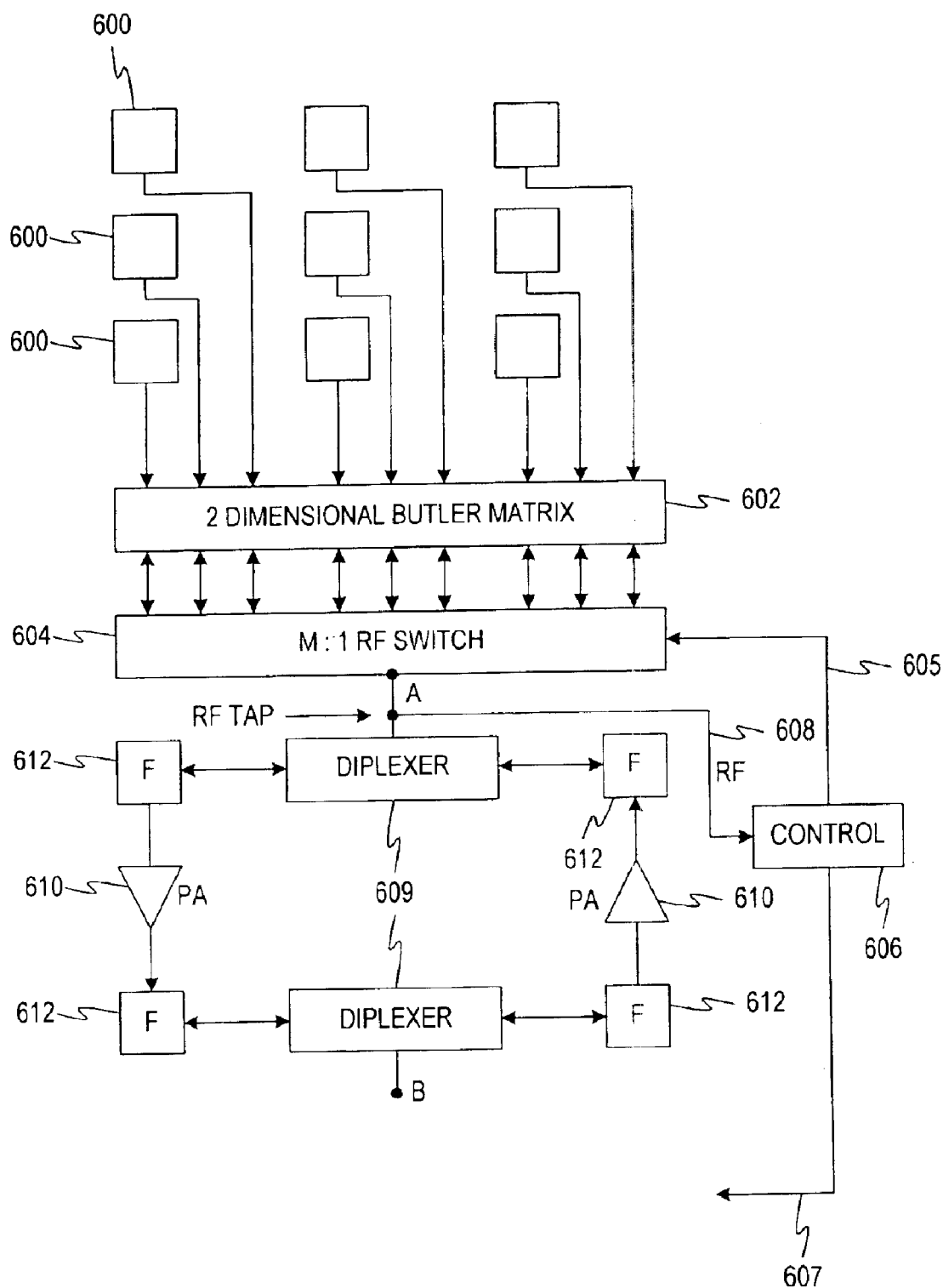
FIG. 19 is a functional diagram showing beamsteering via a Butler matrix.

One example of a Butler matrix for beamsteering is shown in FIG. 19. Here a plurality of antenna elements 600 are arranged in an array, in the illustrated embodiment comprising a 3 by 3 array. The antenna elements 600 may be patches 172 such as in FIG. 7, dipoles such as the dipoles 182 shown in FIG. 8 or another form of antenna elements. All of the antenna elements 600 in the array are coupled with a two-dimensional Butler matrix 602. The two-dimensional Butler matrix 602 is in turn coupled with an M:1 radio frequency (RF) switch 604. In the illustrated embodiment M=9, the total number of antennas 600 in the array coupled with the Butler matrix 602. The RF switch 604 is controlled by a controller or control circuit module 606 via a control output 605 which may also control other similar RF switches for the other repeater antenna array via an additional control output 607 as shown in FIG. 19. The controller 606 may be a part of the controller 210 of FIG. 5 or 6 or 18.

Figure 14:
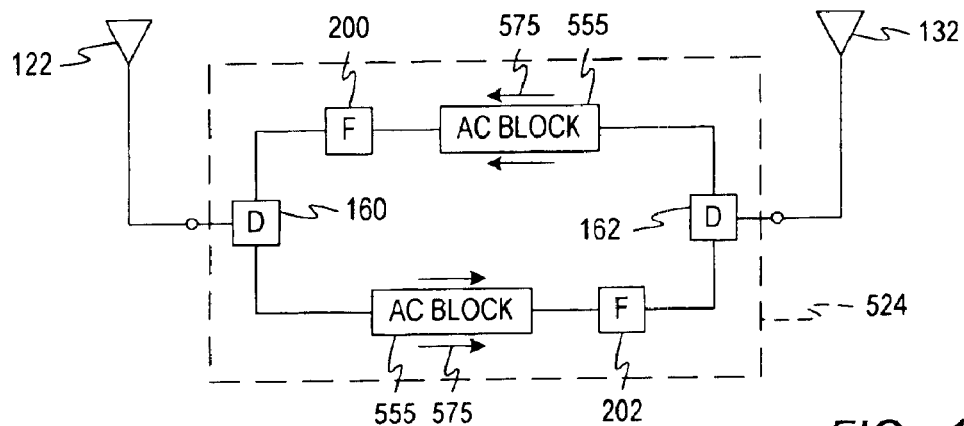
FIG. 14 is a block diagram of a repeater system/similar to the repeater system of claim 5, using the adaptive cancellation (AC) circuit of FIGS. 12 and 13.

The controller 606 may be set to sequentially switch to the beams provided by the antenna 600 via the Butler matrix 602 and RF switch 604 to search for an optimal signal, such as the highest net power output. This is indicated in FIG. 19 by an RF connection 608 from the output of the switch 604 to an input of the control circuit 606 for monitoring the RF output. Other parameters might be used to control switching such as the lowest noise or some other measure of signal quality. Thus, in operation, the control circuit 606 would switch antenna elements until an "optimum" signal output is located and then would remain connected to the antenna element at which the optimal signal was received. RF circuits similar to that shown in FIG. 14 are located between the switch 604 and a similar switch (not shown) which is coupled in the same fashion indicated to a similar Butler matrix to select a beam from a similar antenna array (not shown) at the opposite side of the repeater. The control module 606 similarly controls this second RF switch coupled with an antenna array at the other side of the repeater via a control line 607. The second RF switch may be controlled by the control circuit 606 on the same basis, for example, on the basis of signal strength or some other measure of signal quality. The RF circuit includes respective diplexers 609 (where the respective antenna elements 600 perform both transmit and receive functions) power amplifiers 610 and filters 612 similar to the circuit shown in FIG. 14.

A system of beamforming or beam selection other than a Butler matrix may also be utilized without departing from the invention. For example, the signal processor or controller 210 (e.g., in FIG. 5 or 6 or 18) in addition to its other functions could be programmed and adapted to perform a continuous variable, essentially linear beamforming function by continuous adjustment of the N beams coming in with a variable phase and amplitude weighting being applied, to develop a single beam direction to correspond to the desired beam direction of either the donor or null antennas for communicating with a base station or subscriber equipment. Various phase and amplitude settings could be prestored for a number of beams, for example N beams, each with a given directional characteristic or setting, from which the processor might choose the best match for a given situation.

Figure 20:
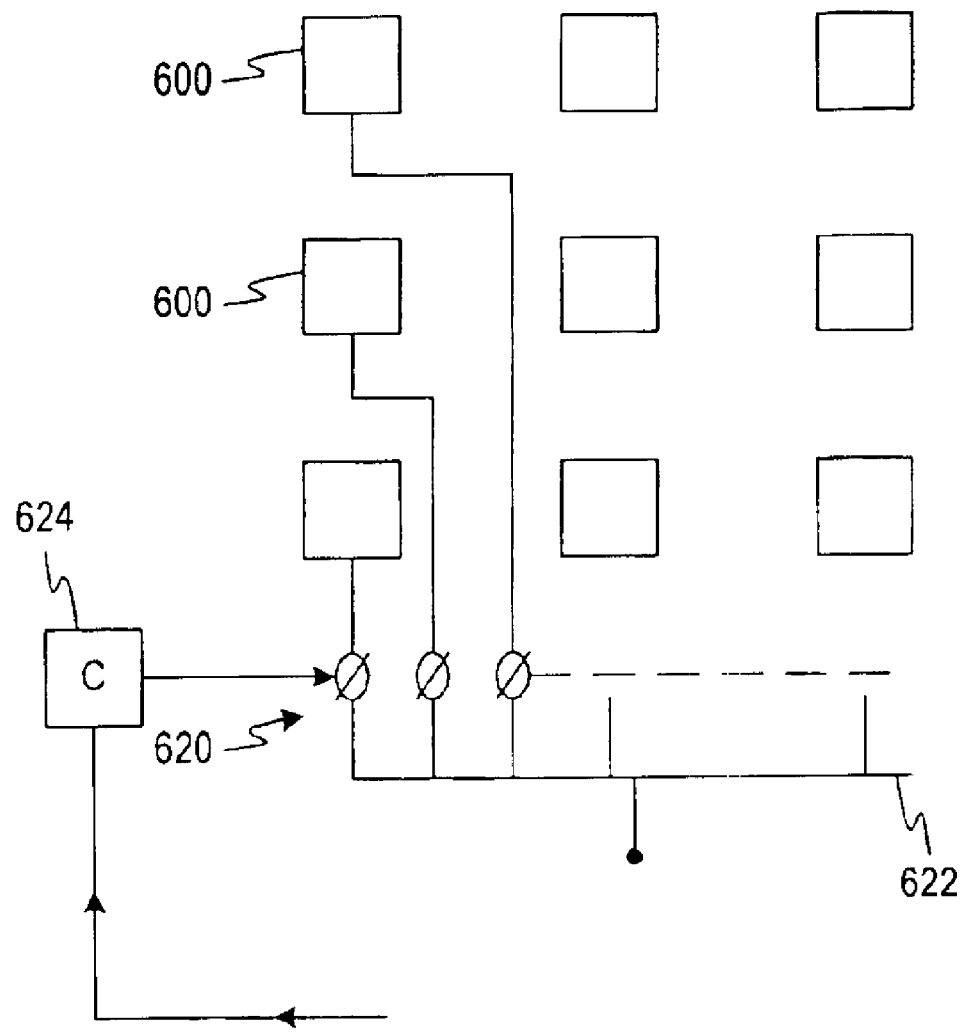
FIG. 20 is a simplified schematic diagram showing beamsteering using phase shifters.

Another method is to build the phasing and combining networks with variable phase devices in series with each antenna element. A look-up table of phase values for discrete angles and elevations can then be used to create with desired beam. In FIG. 20, the antennas 600 in an N by N (e.g., 3 by 3) array are each coupled with a respective one of a plurality of phase shifters 620. The phase shifters are in turn coupled via a corporate feed 622 to an RF output A which may couple with the RF circuits as shown in FIG. 19. A controller 624 is provided to control all of the phase shifters 620. The same arrangement would be utilized for the antenna on the opposite face of the repeater.

The latter arrangements would differ from the Butler matrix in that only one beam or directional output would be developed or generated for a given requirement or situation or relative location. In contrast, in the Butler matrix, a total of N beams would be available at all times with a switching network being utilized to select the one of these N beams best suited for a given situation or placement of the repeater tower relative to the base station and null fill area, respectively.

Figure 21:
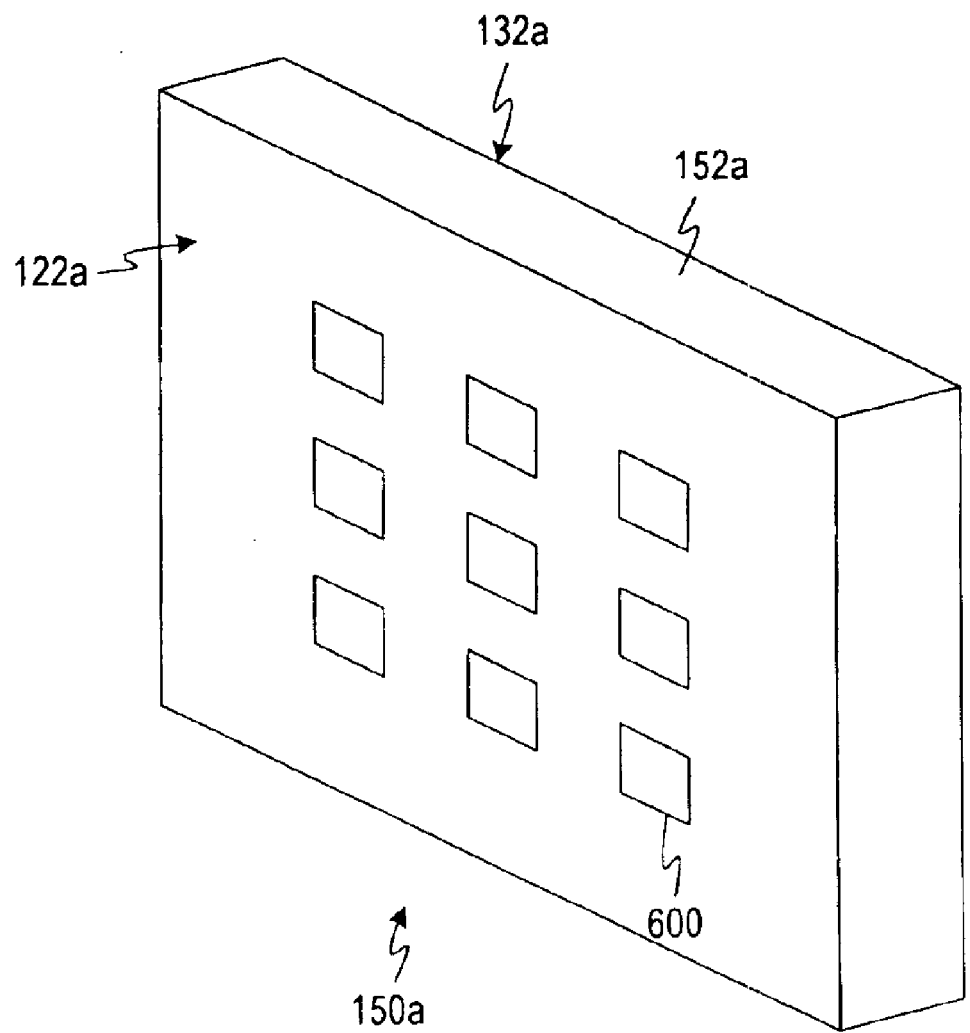
FIG. 21 is a perspective view of a flat panel repeater design.

FIG. 21 illustrates a flat panel approach to repeater construction, as an alternative to the construction shown in FIG. 3. For relatively low power applications, a first face 122*a* may mount a plurality / elements 600 which may be patches, dipole or other antenna elements. Similar antenna elements may be mounted in an array on opposite face 132*a*. The relatively thin housing 152*a* may between the two faces or surfaces 122*a* and 132*a* may house the electronics.

Figure 22:
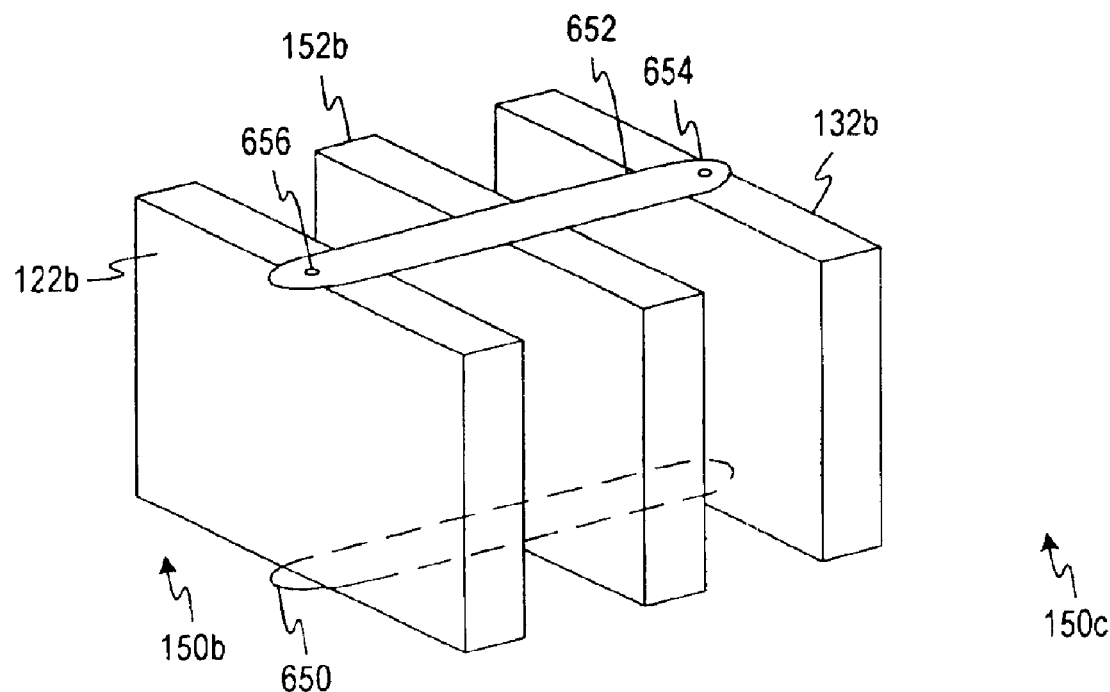
FIG. 22 is a perspective view illustrating a beamsteering scheme via tilting of flat panel arrays similar to the flat panel array of FIG. 21.

Referring to FIG. 22 in an alternate design, each of a pair of flat panels 150*b* and 150*c* mount antenna elements (not shown) only on their outwardly facing surfaces 122*b* and 132*b*. The two panels 150*b* and 150*c* are pivotally mounted to a pair of brackets 650, 652 or other support structure at pivot points 654 and 656 and aligned pivot points (not shown) at the bottom edges of the respective panels 150*b* and 150*c*. A separate electronics housing or enclosure 152*b* may be provided coupled with the brackets or other support structure 650 and 652 intermediate the two flat panels 150*b* and 150*c*. The beamsteering may be accomplished by tilting (or rotating) the respective panels until the maximum signal strength, or some other measure of signal quality is achieved.

Figure 23:
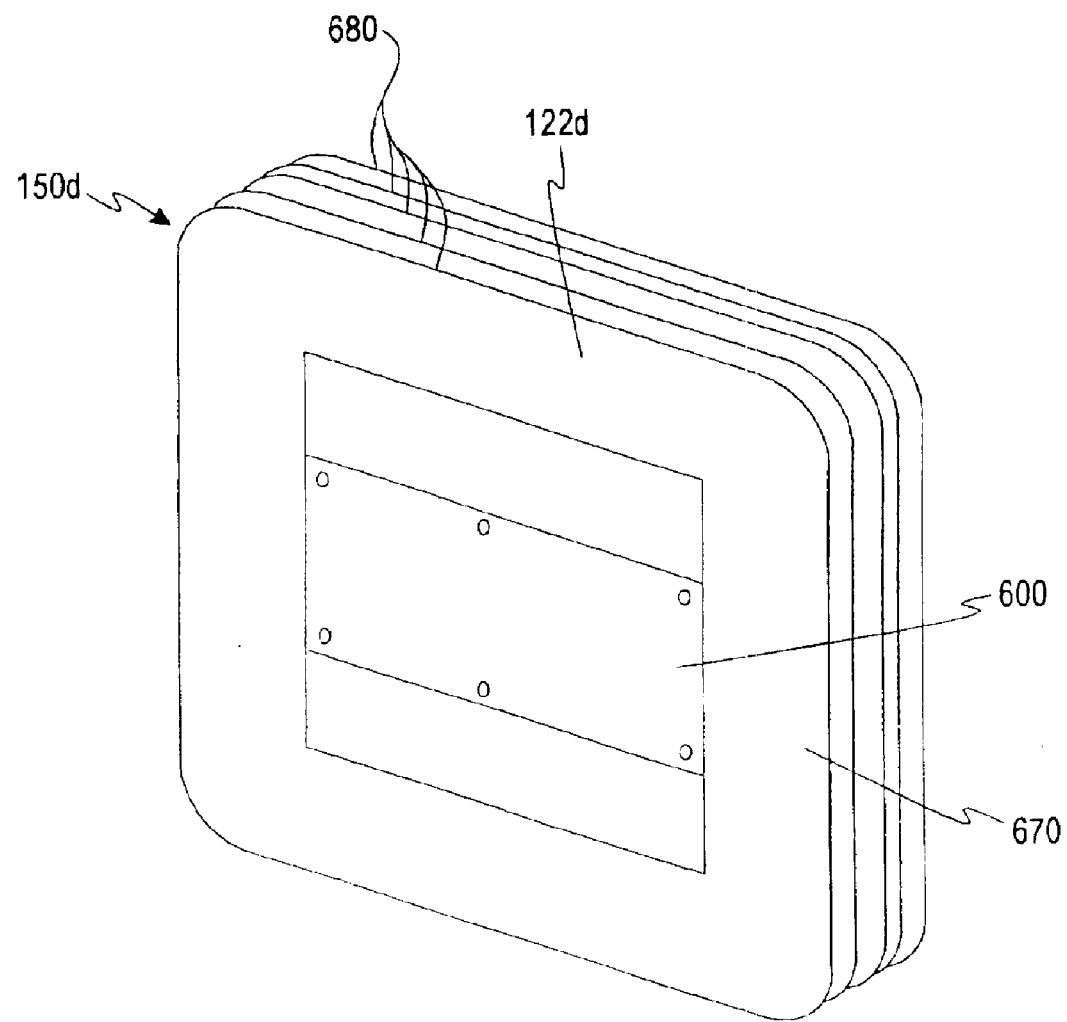
FIG. 23 and FIG. 24 show further embodiments of a flat panel array similar to that of FIG. 21.
Figure 24:
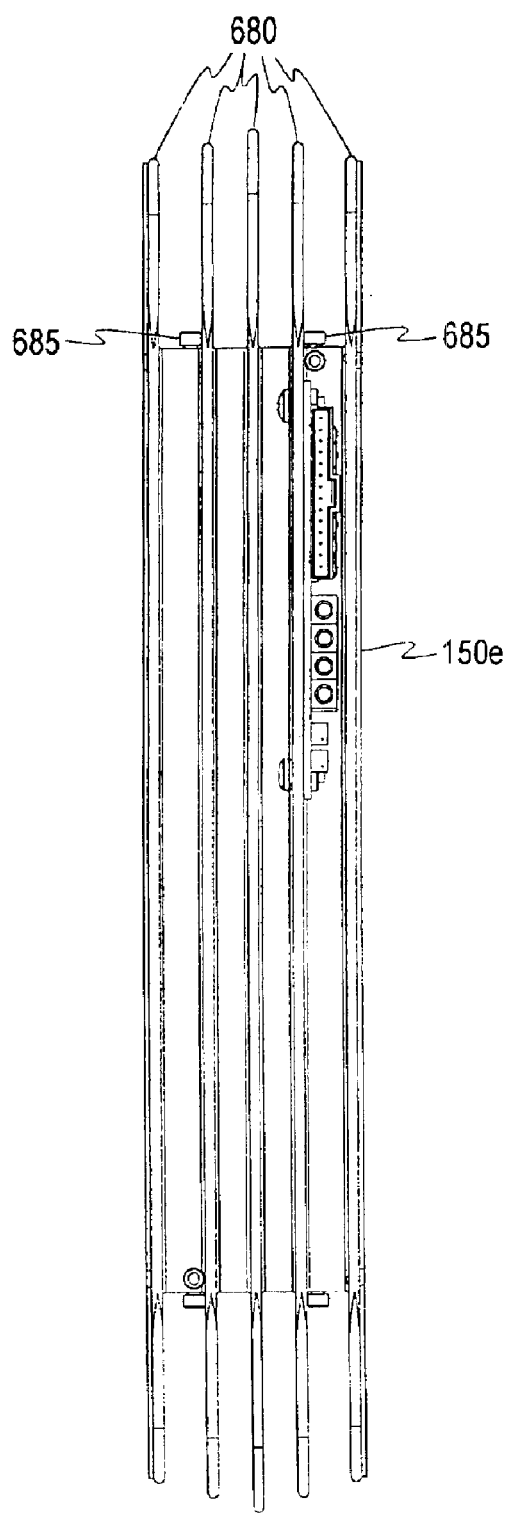

Referring to FIGS. 23 and 24, some further embodiments or modifications to the panels 122 and 132 are illustrated. In FIG. 23, each of the surfaces 122*d* and 132*d* may of antenna module 150*d* include a quantity of radio frequency absorbent material 670 generally surrounding the antenna elements 600.

FIG. 24 illustrates a flat panel antenna 150*e* of the type shown in FIG. 23 with the addition of a plurality of radio frequency chokes in the form of peripherally extending fins 680. These fins 680 may comprise relatively thin strips of conductive material located around the periphery of the antenna module 150*d*. In addition, quantities of radio frequency absorbent material 685 may be located intermediate some or all of the fins about the peripheral surfaces of the module 150*e*.

Figure 31:
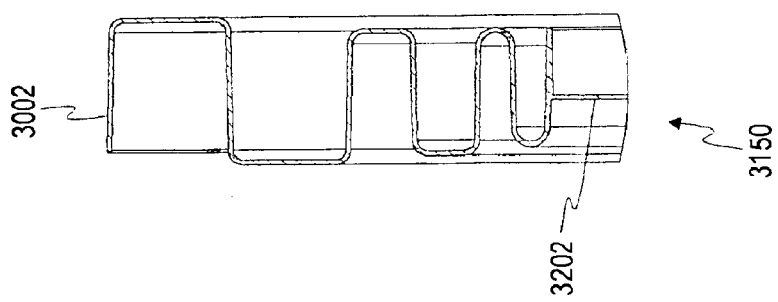
Figure 30:
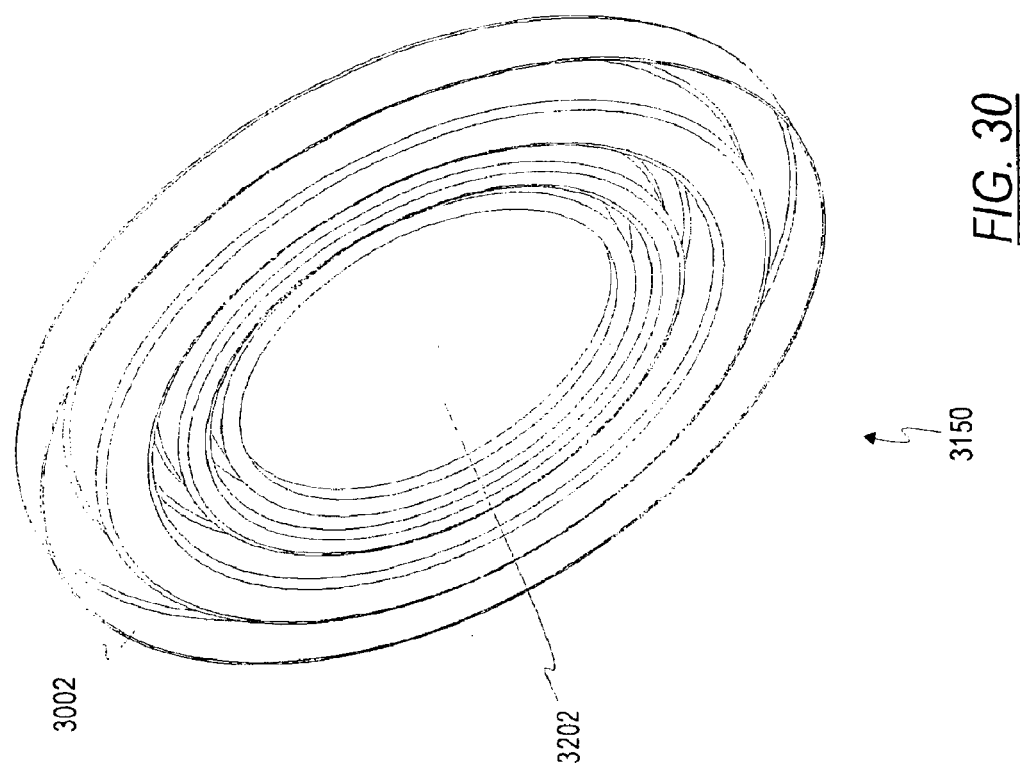
FIG. 30 is a perspective view and FIG. 31 a partial side sectional view showing one alternate form of RF choke structure for a flat panel array.

Referring now to FIGS. 30–35, some alternate embodiments of RF chokes of various forms are illustrated. In FIGS. 30 and 31, the RF chokes 302 on an antenna 3150 are a series of concentric annular rings which extend generally orthogonally from the antenna face 3202, in contrast to the radially extending annular rings 680 shown in the embodiment of FIG. 24. Further, details of the annular ring structure are shown in the side sectional view of FIG. 31. In the side sectional view of FIG. 31, the choke ring structure 3002 resembles a corrugated structure.

Figure 33:
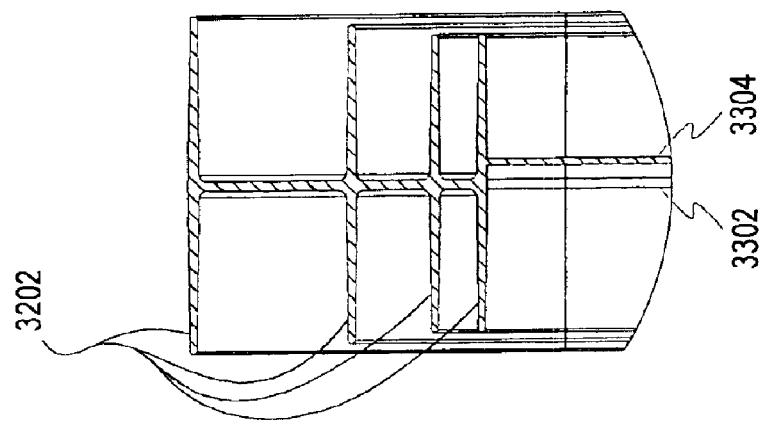
FIG. 32 and FIG. 33 are a perspective view and a partial side sectional view of another embodiment of an RF choke structure for a flat panel array.
Figure 32:
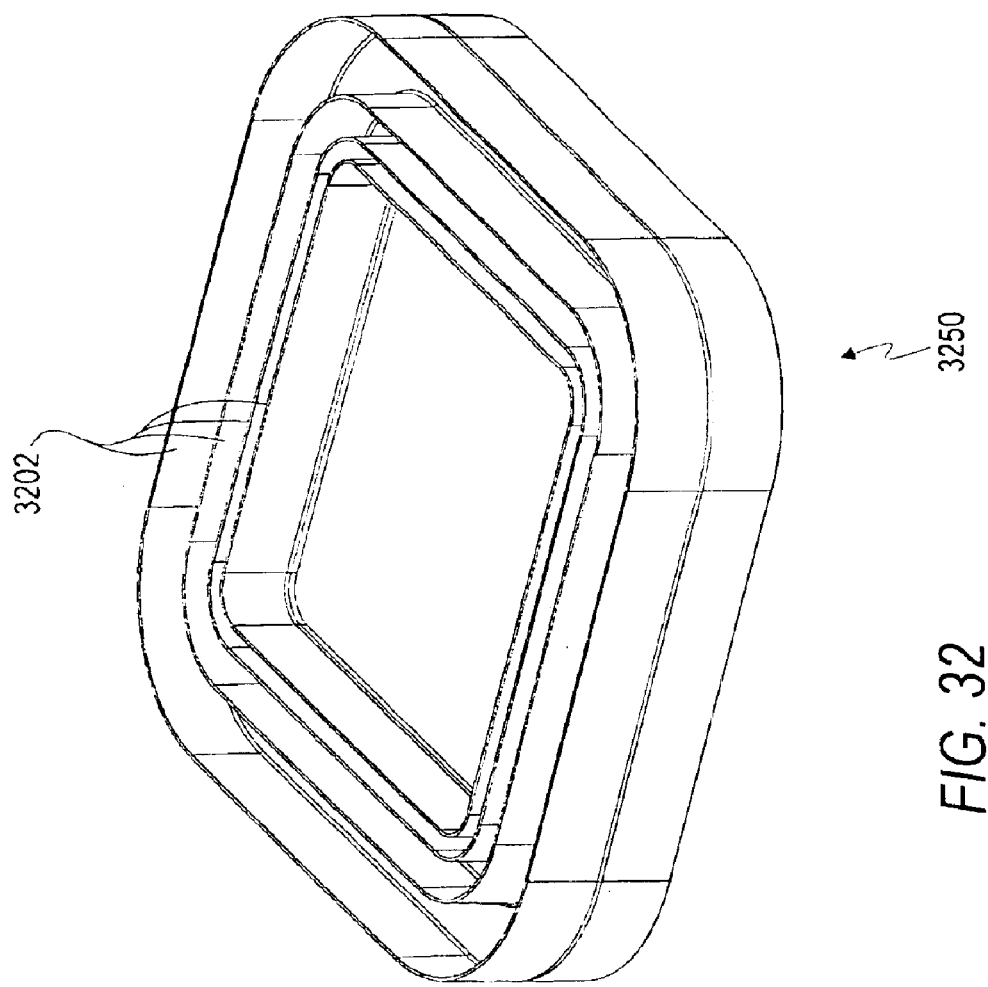

Similarly, FIGS. 32 and 33 show an antenna 3250 having circumferentially spaced, congruent chokes 3202. The chokes 3202 in the embodiment of FIGS. 32 and 33 are generally rectangular or rectilinear in configuration and extend orthogonally outwardly from opposite sides of central flat surfaces 3302, 3304 which may mount respective radiating elements of a repeater structure. FIG. 33 is an enlarged partial sectional view illustrating further details of the chokes 3202 and the surfaces 3302, 3303.

Figure 34:
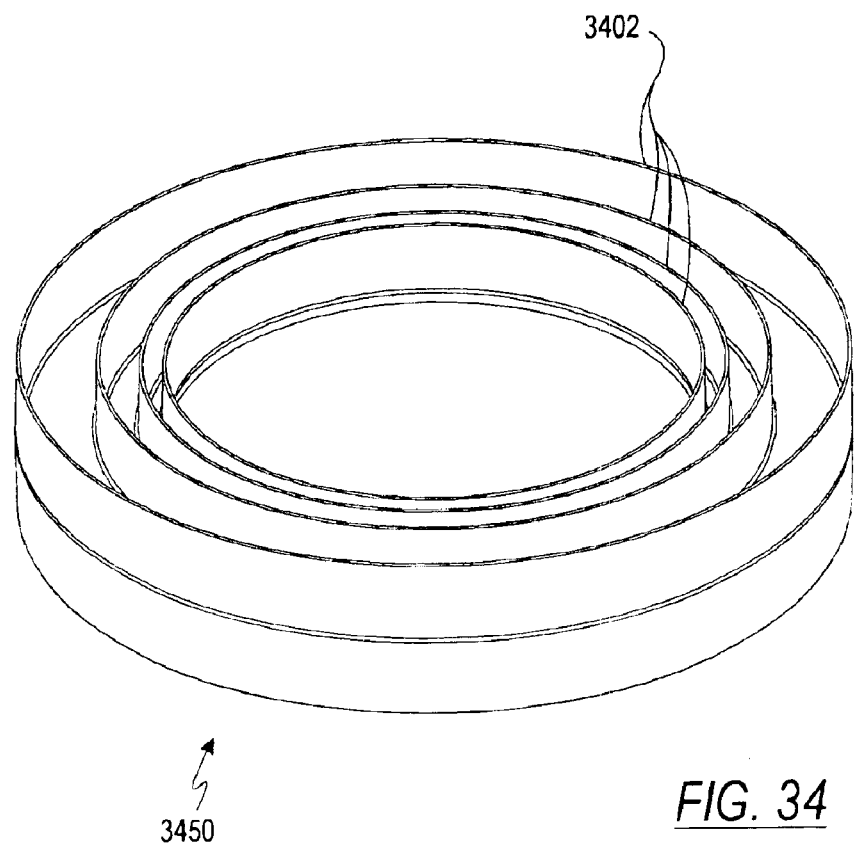
FIG. 34 and FIG. 35 are a perspective view and a partial side sectional view of another embodiment of an RF choke structure for a flat panel array.
Figure 35:
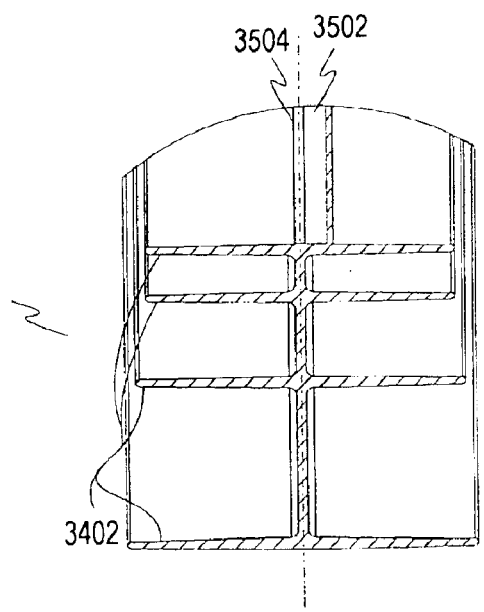

FIGS. 34 and 35 illustrate a structure essentially similar to that shown in FIGS. 32 and 33, however, in a circular configuration. Thus, like reference numerals, with prefixes 34 and 35, are utilized to designate like elements and components.

Figure 25:
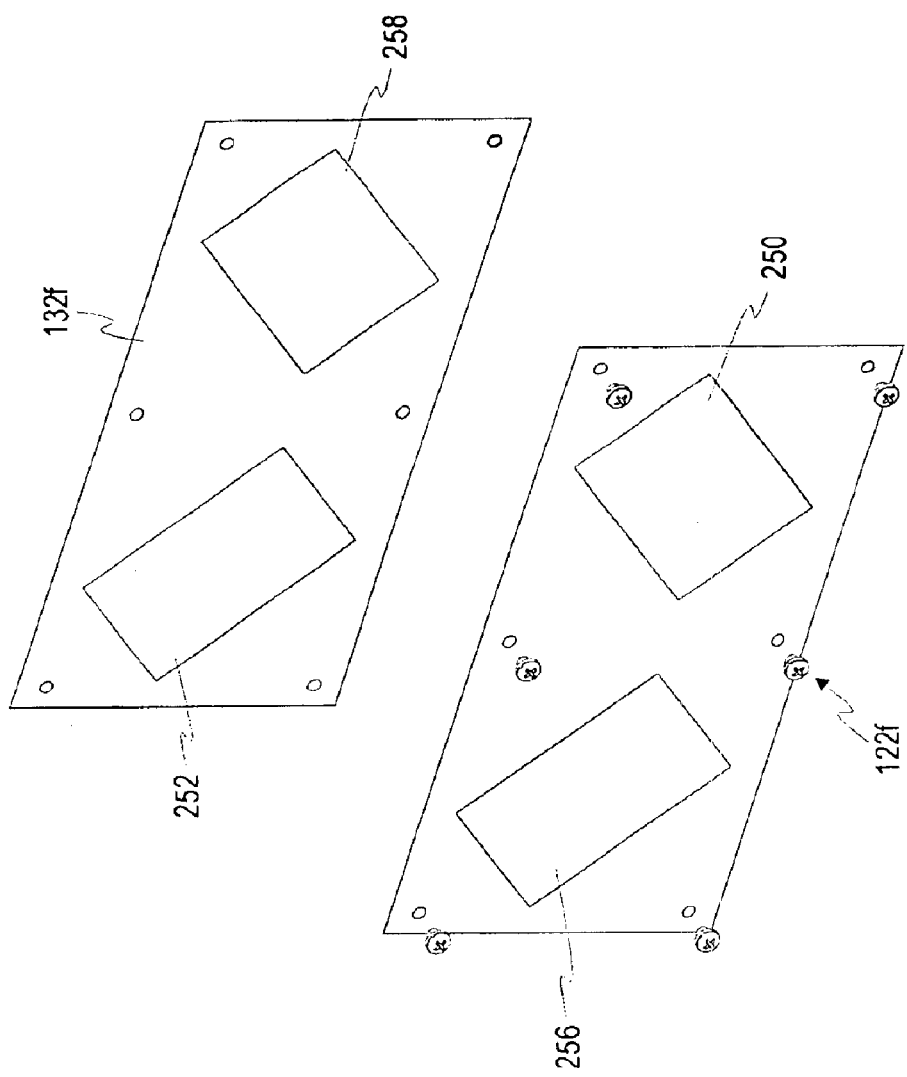
FIG. 25 is a partial exploded perspective view of the flat panel array of FIG. 23 and FIG. 24, showing further details thereof.

Referring to FIG. 25, respective uplink and downlink patch elements on each side of an antenna may be orthogonally polarized. This is illustrated in FIG. 25, wherein patch elements on faces 122*f* and 132*f* are orthogonally polarized with respect to the corresponding patch elements on the other surface. For example, the transmit/downlink radiating element 250 on the surface 122*f* is polarized orthogonally to the transmit downlink radiating element 250 on the opposite surface 122*f*. Similarly, the uplink/receive patch 256 on the surface 122*f* is orthogonally polarized relative to the uplink/receive patch 258 on the surface 132*f*.

An antenna is (simplifying somewhat) a path by which electrons get accelerated back and forth (i.e. a "race-track"). For example, in a dipole antenna, electrons accelerate from one end, towards the center (where they have the greatest velocity), then de-accelerate towards the other end (where the velocity is the slowest). They then turn around and accelerate back the other way. They do this at the rate of the resonant frequency of the antenna. The feed point of the antenna (for a dipole, at the center) is the position in which the electrons are moving the fastest. Thus, voltage (potential) of the antenna is tapped from this position. Electromagnetic energy therefore radiates from the ends of an antenna (dipole, or patch) in the direction of the accelerating electrons. This direction is called the antenna polarization (direction). Displacement currents (virtual electrons) therefore go from one end of the dipole, curve out in space, and terminate at the other end of the dipole. For two adjacent antennas, oriented in the same direction, where one is transmitting (active) and the other is receiving (passive), the active antenna pushes virtual electrons into space which terminate on the passive antenna. These virtual electrons then force the actual electrons on the surface of the passive antenna to accelerate, and induce a potential at its feed point. However, if the two antennas were not oriented in the same direction (being orthogonal . . . or perpendicular; for instance, as described above in FIG. 25) then the active antenna could not accelerate electrons on the other (passive) antenna. The "race-track" on the passive antenna is extremely short. These antennas are considered orthogonal, and therefore do not couple. Orthogonal antennas, on opposite sides of the repeater, would not couple and therefore would appear isolated from each other. Thus, the system gain could be increased without inducing ringing.

Figure 26:
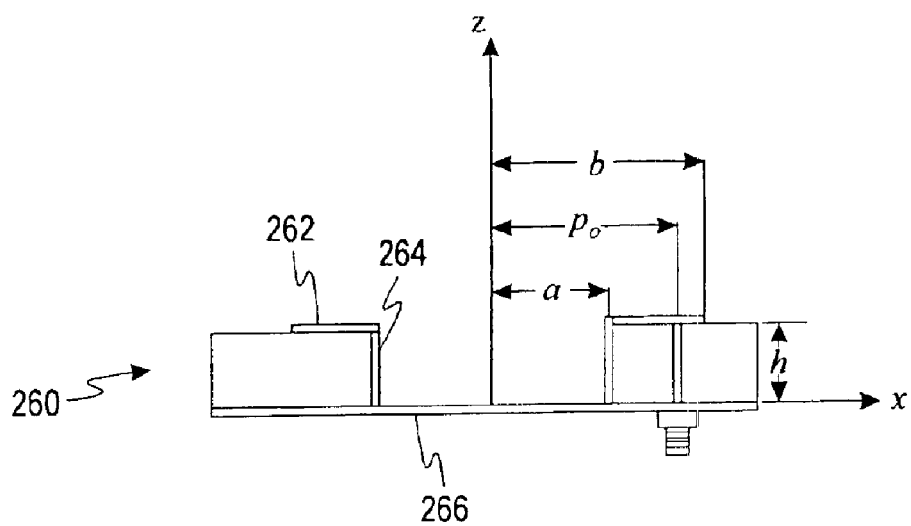
FIG. 26 and FIG. 27 are side sectional and top views, respectively, of a reduced surface wave (RSW) patch antenna.
Figure 27:
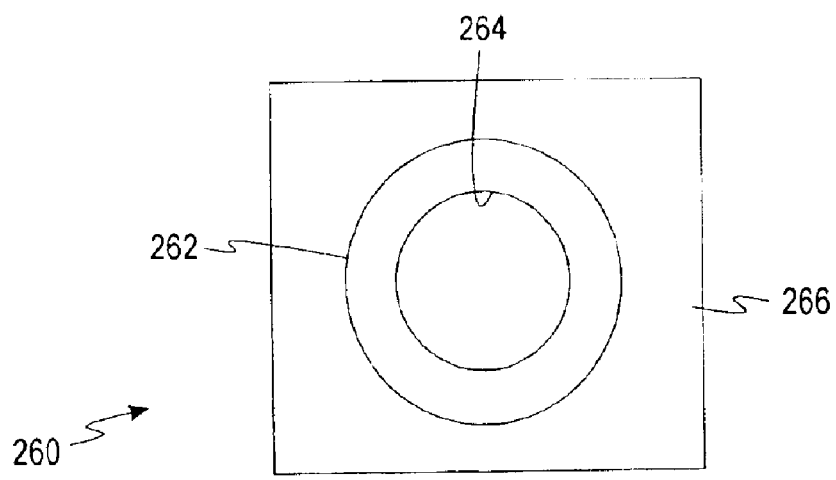

In an alternative embodiment, a reduced surface wave (RSW) type of antenna structure might be utilized in place of the patches shown in the prior figures of drawing. FIGS. 26 and 27 are a side sectional view and a top plan view of one example of a probe-fed, shorted annular ring, reduced surface wave patch antenna 260. An RSW patch antenna element, is simply a patch that forces more energy in the directed area, and not to the sides; near the ground plane. There are many types of RSW patches, but the most common is a recessed patch inside a partial cavity. The cavity walls act as a field suppressor, and "catch" field lines that are directed to the sides of the patch, rather towards the direction perpendicular to the patch and ground plane. If both patches (on opposite sides) are RSW patches, then they would have reduced coupling (i.e. greater isolation); which allows the system active gain to be increased.

RSW microstrip antennas produce only a small amount of surface-wave radiation. In addition, if printed on electrically thin substrates, these antennas only weakly excite lateral waves (space waves that propagate horizontally along the substrate interface). As a result, these antennas do not suffer from the deleterious effects of surface and lateral wave scattering. These characteristics make the RSW antenna ideal for applications where the supporting substrate or ground plane of the antenna is small, in which case diffraction of the surface and lateral waves from the edges of the structure may be quite significant for conventional microstrip patch antennas. RSW antennas also have promise for array applications, where the presence of surface and lateral waves for conventional patch radiators produce significant mutual coupling and may lead to scan blindness.

For a given size antenna element (patch, dipole, . . . ) increasing the size of the ground plane behind the element reduces the Front to Back (F/B) ratio of the antenna. More specifically, the larger the ground plane, the less energy gets radiated to the back side. Thus, increasing the size (of the faces) of the side-to-side repeater reduces the amount of energy that each face radiates to the backward face. Another way of explaining this is that by increasing the size of the repeater, the lower the coupling between the opposite antennas (i.e. patches). This therefore increases the isolation between the patches on opposites sides, and allows one to increase the active gain for the system. However, where the size of the ground plane is limited by other considerations, the RSW patch technology may be employed.

To date, the most promising RSW design is the Shorted-Annular-Ring Reduced-Surface-Wave (SAR-RSW) antenna. One example of this type of antenna 260, shown in FIGS. 26 and 27, is a conventional annular ring microstrip antenna 262 with an inner boundary 264 short-circuited to a conducting ground plane 266. The outer radius dimension is chosen to eliminate surface-wave excitation from the equivalent ring of magnetic current at the outer edge of the antenna that corresponds to the $TM_{011}$ cavity patch mode. (The modes are denoted using the notation $TM_{\varphi\rho}$.) The inner radius is chosen to make the patch resonant at the design frequency.

Figure 28:
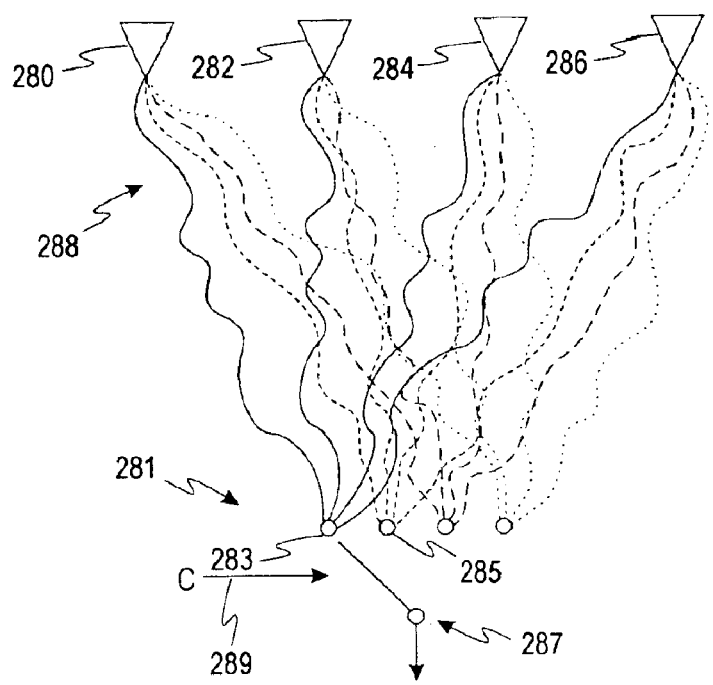
FIG. 28 and FIG. 29 are two diagrammatic representations of beamsteering using striplines of different lengths.
Figure 29:
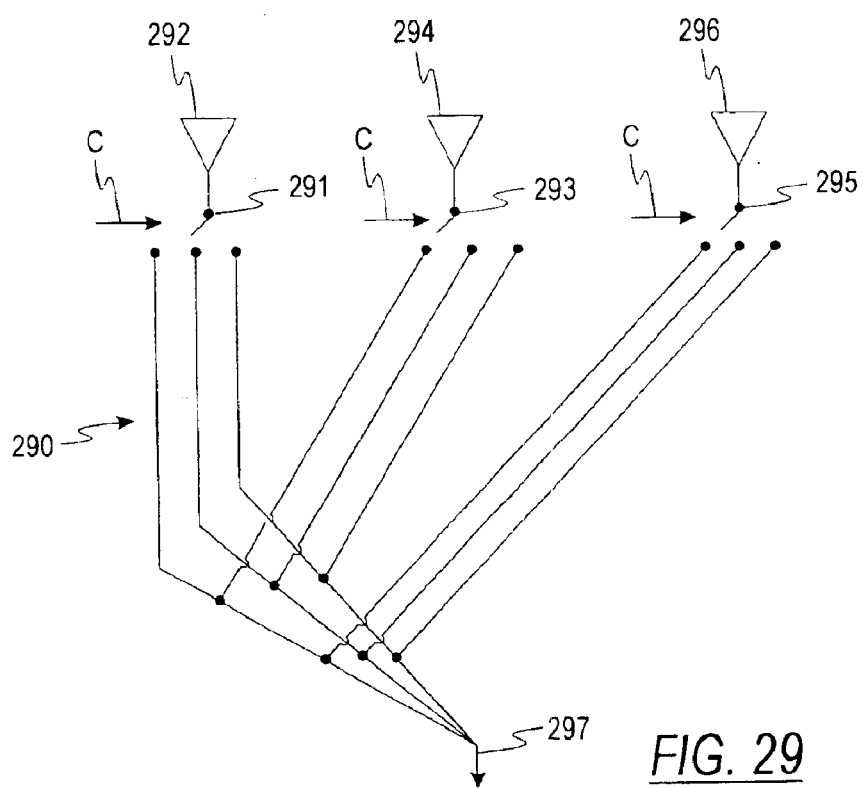

FIGS. 28 and 29 are simplified diagrams illustrating beamsteering via the use of various delay lengths by using striplines of different lengths on different layers of a multi-layer printed circuit board selectable via RF switch (FIG. 28) or striplines of different lengths printed on the same circuit board and selectable via RF switches (FIG. 29). Thus, in FIG. 28, antenna elements 280, 282 and 284, 286 are each coupled to multiple striplines of different lengths, represented by various solid and broken lines designated generally by the reference numeral 288. All of these lines 288 of various lengths are coupled together at radio frequency (RF) summers 281. That is, all of the lines 288 of a first length are coupled to one terminal a summer 283. All of the lines 288 of a second length are coupled to a summer 285, and so forth. A radio frequency (RF) switch 287 operated in response to a control signal on a control line 289 selects from among the lines of different lengths to the various antenna elements 280, etc. attached to the summers 283, 285, etc. The control signal may be produced automatically in response to a measurement of signal strength or some other optimal signal quality, in order to accomplish beamsteering via the selection or adjustment of stripline length.

In the approach shown in FIG. 29, the selection of striplines 290 of varying length is accomplished at the antenna elements 292, 294, 296, etc. by respective radio frequency switches 291, 293 and 295. All of these delay lines of varying length feed a common RF output 297. The delay line length for each antenna may be selected either independently or in unison with the selection of delay lines other antennas, in response to suitable control signals (C) in much the same fashion as in FIG. 28, and/or as described above in response to detection of an optimal signal level or some other optimal signal quality measurement.

Typically, a repeater site uses the physical separation of the donor and null antennas to achieve enough isolation to allow the repeater to operate with gains of 60 to 95 dB. Because the antennas are located relatively close together in the integrated repeater of FIG. 3 (or FIG. 21 or FIG. 23), another approach is needed to achieve isolation. Such an approach can include the use of radio frequency chokes in the enclosure between the antennas to reduce the coupling between the antennas, or the use of an adaptive interference canceller to provide additional gain and phase margin, is described in the above-referenced application Ser. No. 09/483,234, filed Jan. 14, 2000. In this latter copending application, an adaptive interference canceller samples the signal at the output of the repeater and compares it to the signal at the input of the repeater. It then takes the undesired signal and injects a version of it into the input of the repeater with suitable phase and amplitude to cancel the undesired signal in the output. The integrated repeater of the present invention may use such an interference canceller 208 in the downlink and/or the uplink paths as required for a specific application.

In this regard, a limiting characteristic for repeaters is that of the feedback loop, or conversely, the isolation between the two opposing antennas (or sensors). That is, the total front to back (F/B) ratio for the system, or isolation, must be higher than the desired gain. Generally speaking, the isolation between donor and null antennas is equal to the total repeater gain plus some margin, typically around 10 to 15 dB. Therefore, the repeater gain will in general be less than the isolation minus the margin. For example, if the isolation between antennas is around 60 dB, then the maximum repeater gain allowed will be about 45 dB. For PCS frequencies, these figures may result in a repeater range of less than 100 feet.

In a scattering environment, which is common in PCS, every 6 dB of additional system gain will double the coverage distance. Thus, obtaining an additional 24 dB of isolation between the two antennas, will allow the range to double 4 times, to 1600 feet. For conventional repeater systems as in FIG. 1, where the two antennas and repeater electronics are in three separate enclosures, and locations, the donor antenna (to the base station) and null antenna (to the desired coverage area), are separated in space by (usually) more than 10 feet. This distance adds over 50 dB to the isolation between antennas, generating a total isolation value of well over 100 dB. Therefore, with a 15 dB margin, this type of system can utilize a total gain of up to 85 dB or more, which results in fairly large range and coverage.

For the integrated repeater of this invention, where the opposing antennas are in or on the same housing or enclosure, and separated in space by as little as a few inches, isolation is typically limited to a value below 80 dB or so. This therefore allows a total repeater gain of no more than 65 dB, which may limit the system range to a few hundred feet or less.

The below-described embodiment of an adaptive cancellation approach removes a significant portion (between 10 dB and 40 dB) of the feedback signal power, therefore increasing the total system isolation by the same amount (10 to 40 dB). This additional isolation can be used to achieve greater repeater gain, and therefore significantly extend the range of the system. This is especially useful in the integrated repeater described in this application. The cancellation scheme (one embodiment of which is described in further detail below) uses digitally processed information to generate a signal, which, when added to the original input signal, cancels the feedback signal.

Finally, the microprocessor or controller (repeater controller) 210 provides the repeater control functions. This controller provides all setup, communications, and monitoring functions for the repeater. These functions include those related to setting the beamforming and selection functions to the desired beam, as mentioned above, and setting the amplifier gain and frequency of operation to the maximum usable gain for stability and the power rating of the repeater.

The controller's functions may also include monitoring of power levels at various points in the system, monitoring of the status of the devices in the system, for example for over-power, under-power, oscillation, etc. The controller may also include communication ports for communication with outside devices. For example, a local connection, such as an RS-232 port may be provided to communicate with a laptop computer which may be used in the field to exchange data with the controller, update data or program routines, or the like. A remote communication port or protocol may also be employed to enable communications with a network management system, through a local telephone company or wireless serial communication port, such as a data modem or TCP/IP (Transmission Control Protocol/Internet Protocol) or SNMP (Simple Network Management Protocol). In this regard the controller 210 may comprise a microprocessor with a UART (Universal Asynchronous Receive Transmit) to enable the desired communications and command structures and protocols.

Figure 9A:
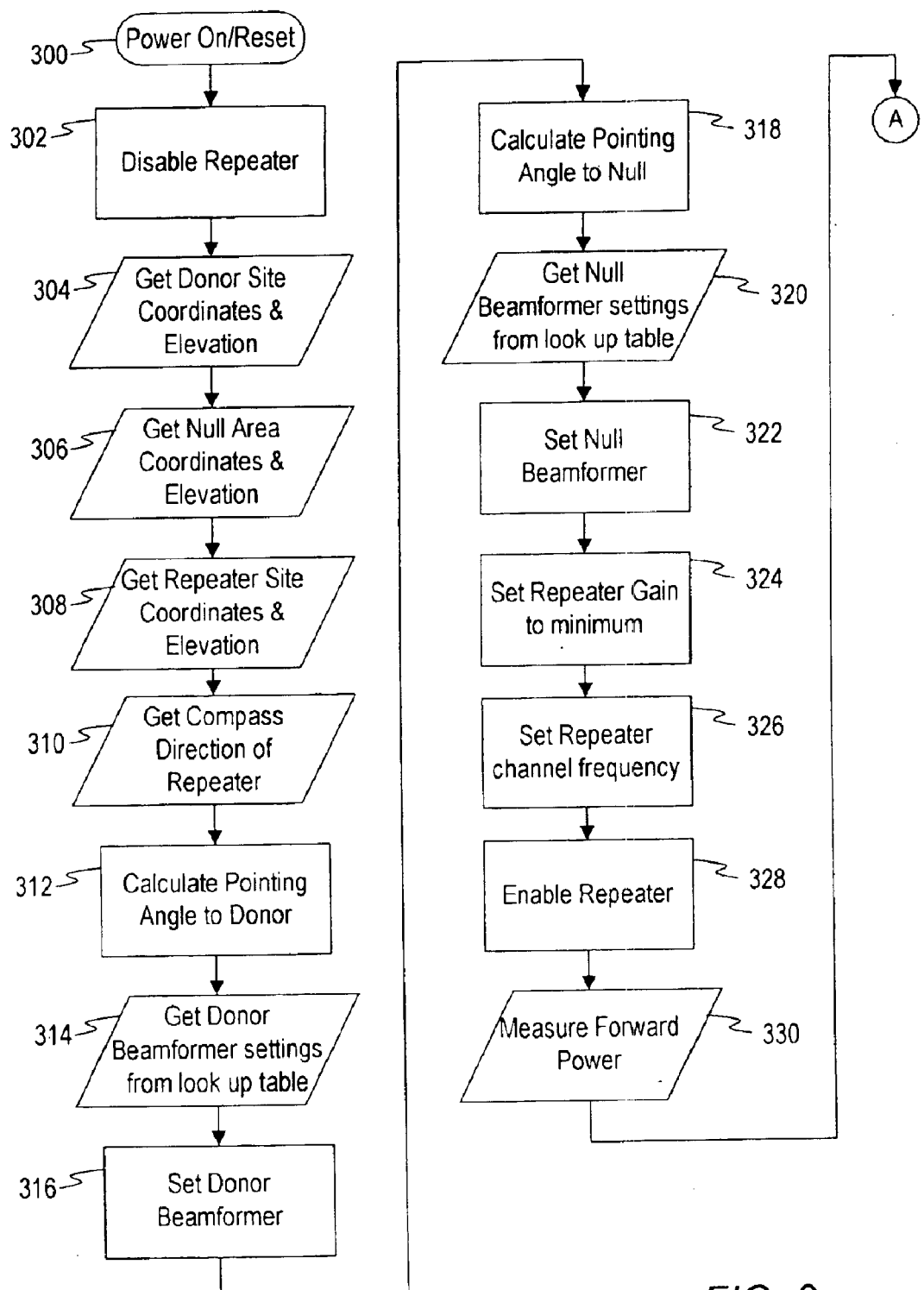
FIG. 9 is a flowchart or flow diagram of a repeater setup program in accordance with one embodiment of the invention.
Figure 9B:
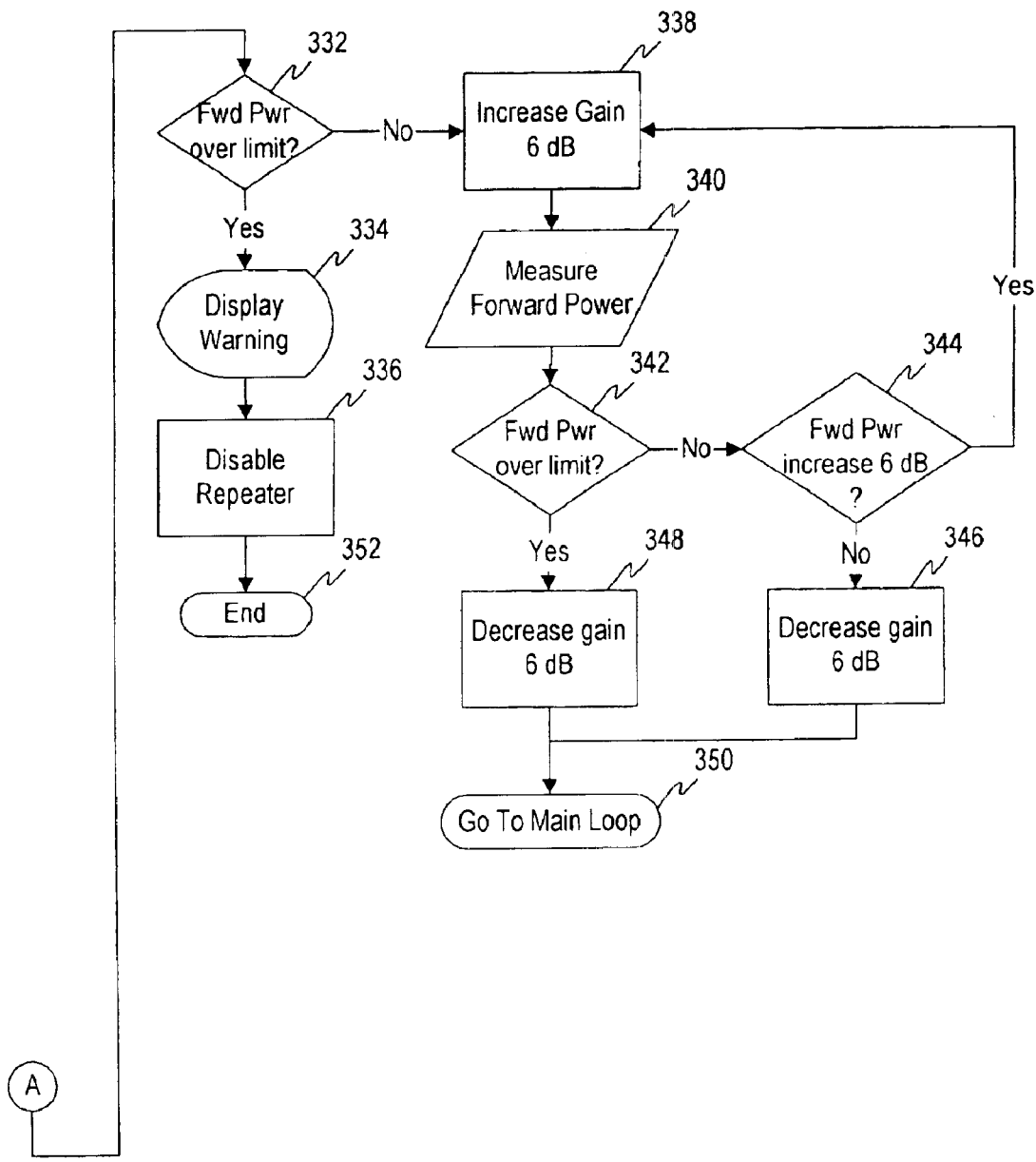

FIGS. 9a and 9b are a sample flow chart for the initialization of the repeater, which includes beam selection on the donor antenna and null antenna and the initial gain settings. The blocks in the flowchart of FIG. 9 are as follows:

| Reference No. | Function |
| --- | --- |
| 300 | Power On/Reset |
| 302 | Disable Repeater |
| 304 | Get Donor Site Coordinates & Elevation |
| 306 | Get Null Area Coordinates & Elevation |
| 308 | Get Repeater Site Coordinates & Elevation |
| 310 | Get Compass Direction of Repeater |
| 312 | Calculate Pointing Angle to Donor |
| 314 | Get Donor Beamformer Settings From Look-Up Table |
| 316 | Set Donor Beamformer |
| 318 | Calculate Pointing Angle to Null |
| 320 | Get Null Beamformer Settings from Look-Up Table |
| 322 | Set Null Beamformer |
| 324 | Set Repeater Gain to Minimum |
| 326 | Set Repeater Channel Frequency |
| 328 | Enable Repeater |
| 330 | Measure Forward Power |
| 332 | Forward Power Over Limit? |
| 334 | Display Warning |
| 336 | Disable Repeater |
| 338 | Increase Gain 6 dB |
| 340 | Measure Forward Power |
| 342 | Forward Power Over Limit? |

-continued

| Reference No. | Function |
| --- | --- |
| 344 | Forward Power Increase 6 dB? |
| 346 | Decrease Gain 6 dB |
| 348 | Decrease Gain 6 dB |
| 350 | Go to Main Loop |
| 352 | End |

Figure 10:
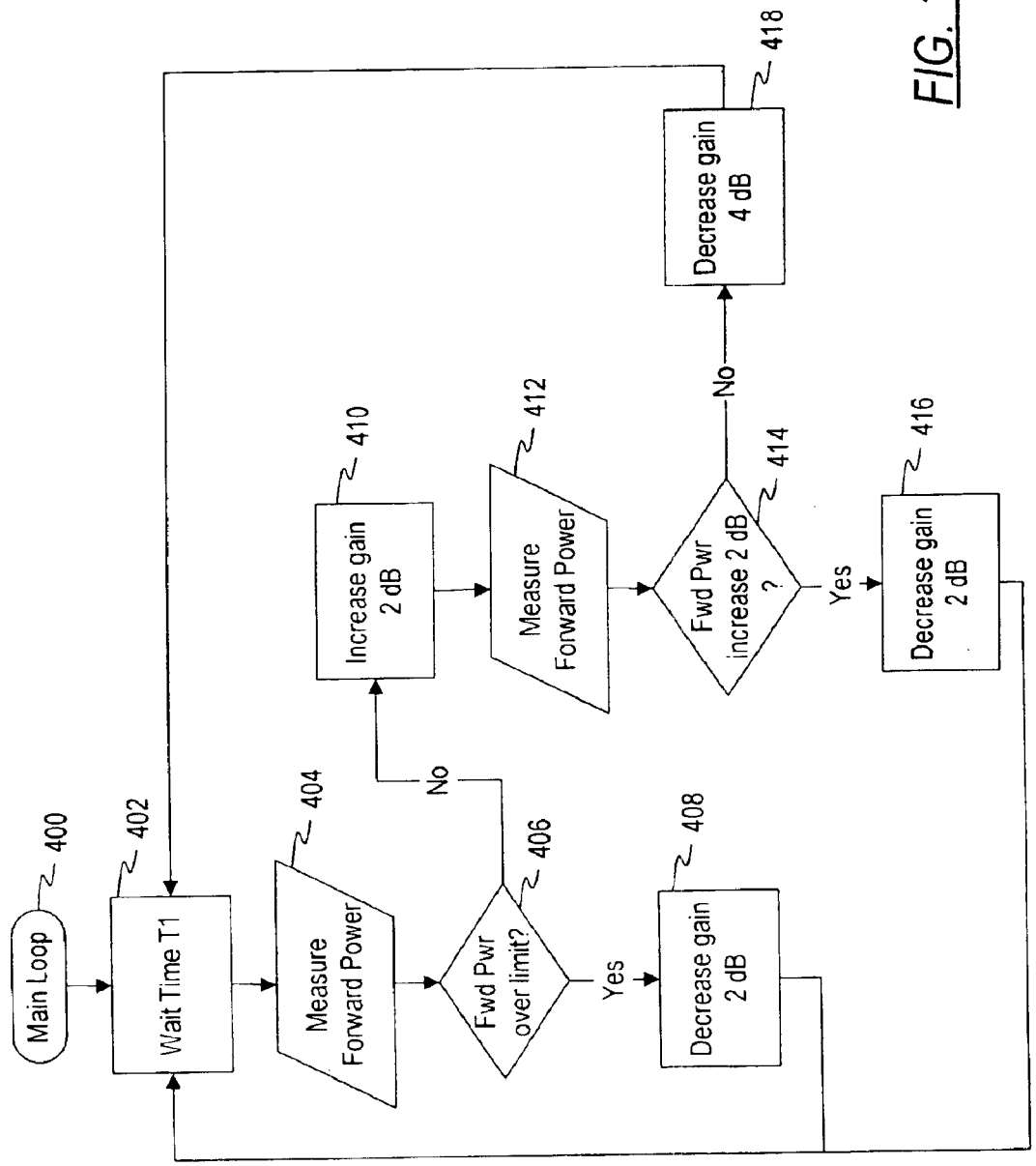
FIG. 10 is a flowchart or flow diagram of one embodiment of a repeater main operation loop.

FIG. 10 is a sample flow chart for a main operational loop of the repeater control program, and includes only the functions related to auto gain control of the repeater. The blocks in the flow chart of FIG. 10 are as follows:

| Reference No. | Function |
| --- | --- |
| 400 | Main Loop |
| 402 | Wait Time T1 |
| 404 | Measure Forward Power |
| 406 | Forward Power Over Limit? |
| 408 | Decrease Gain 2 dB |
| 410 | Increase Gain 2 dB |
| 412 | Measure Forward Power |
| 414 | Forward Power Increase 2 dB |
| 416 | Decrease Gain 2 dB |
| 418 | Decrease Gain 4 dB |

Figure 11:
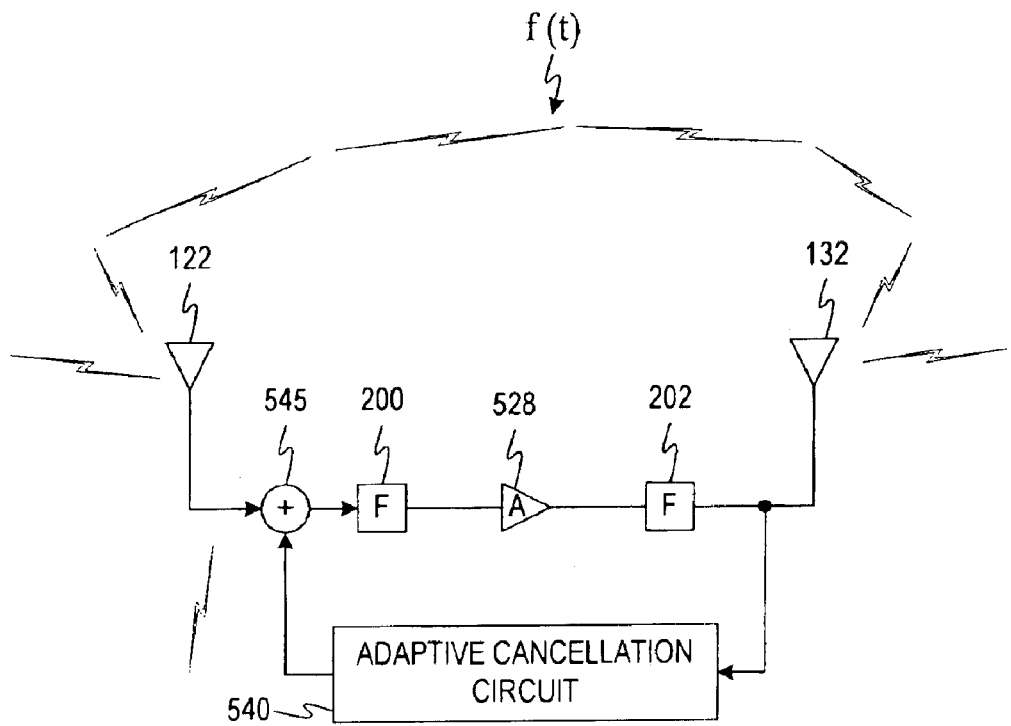
FIG. 11 is a simplified block diagram of one signal path through a repeater system, as in FIGS. 5 and 6, showing the interference canceller as an adaptive cancellation circuit.

Referring now to FIGS. 11–18, an embodiment of an adaptive cancellation system will be described. FIG. 11 shows a simplified block diagram of one path through a repeater system. The input signal, S(t) from the base station (for the downlink path) (would be reversed for the signal for the uplink path), is received via an antenna 122, bandpass filtered, amplified (at 528, with active gain=G), filtered again, and finally transmitted by an antenna 132. Some of the transmitted signal energy 527 couples back (through space, or through the electronics) into the receive antenna 122. This is denoted as the feedback signal, f(t), which is simply a delayed version (attenuated) of the original signal, S(t). Therefore, the composite signal, S(t)+f(t), is fed into the amplifier A (528), with output G(S(t)+f(t)). Assume for example, that the antennas have 0 dBi gain, then the new feedback signal is G f(t). The propagation of this signal, back to the input antenna, will incur attenuation, H. Therefore, the amplified, attenuated signal at the input antenna will be H G f(t). If this signal is comparable in power to the original signal S(t), then the amplifier 28 will go unstable, and oscillate (ring). This oscillation will cause severe distortion in the desired signal.

FIG. 11 also shows an adaptive cancellation circuit 540. The goal of this circuit 540 is to create a 180 degree shifted f(t) signal–f(t), and sum it with the input signal (which includes f(t)), at a summing junction 545, and thereby remove the feedback signal f(t).

Figure 12:
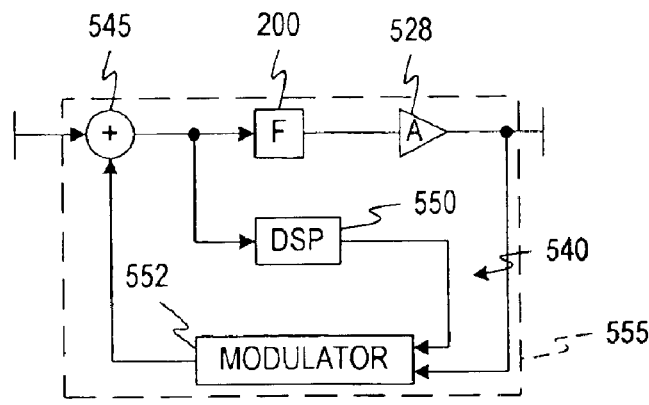
FIG. 12 is a block diagram (high level) of a (digitally) adaptive cancellation circuit in accordance with one embodiment of the invention.

FIG. 12 shows a general block diagram (high level) of one form of the adaptive cancellation circuit 540. In this approach, the input (RF) signal is summed at the junction 545 with a modulated signal constructed via a digitally adaptive process, to destructively interfere with the feedback signal embedded in the input composite signal. After the summation, the composite signal, S(t)+f(t), is digitally sampled and digitally processed via a digital signal processor (DSP) 550, which computes an intermediate signal for a modulator 552. The modulator 552 takes the intermediate signal, and a sample of the amplified (output) signal, and creates a phase shifted copy –f(t) of the interfering signal f(t). This process will work with many, if not most, of the digitally adaptive algorithms for feedback control. Additionally, this methodology does not require an injected signal (training or pilot tone, or wideband noise), for the adaptive process. The entire circuit shown in FIG. 12 may be designated as an "AC block" 555.

Figure 13:
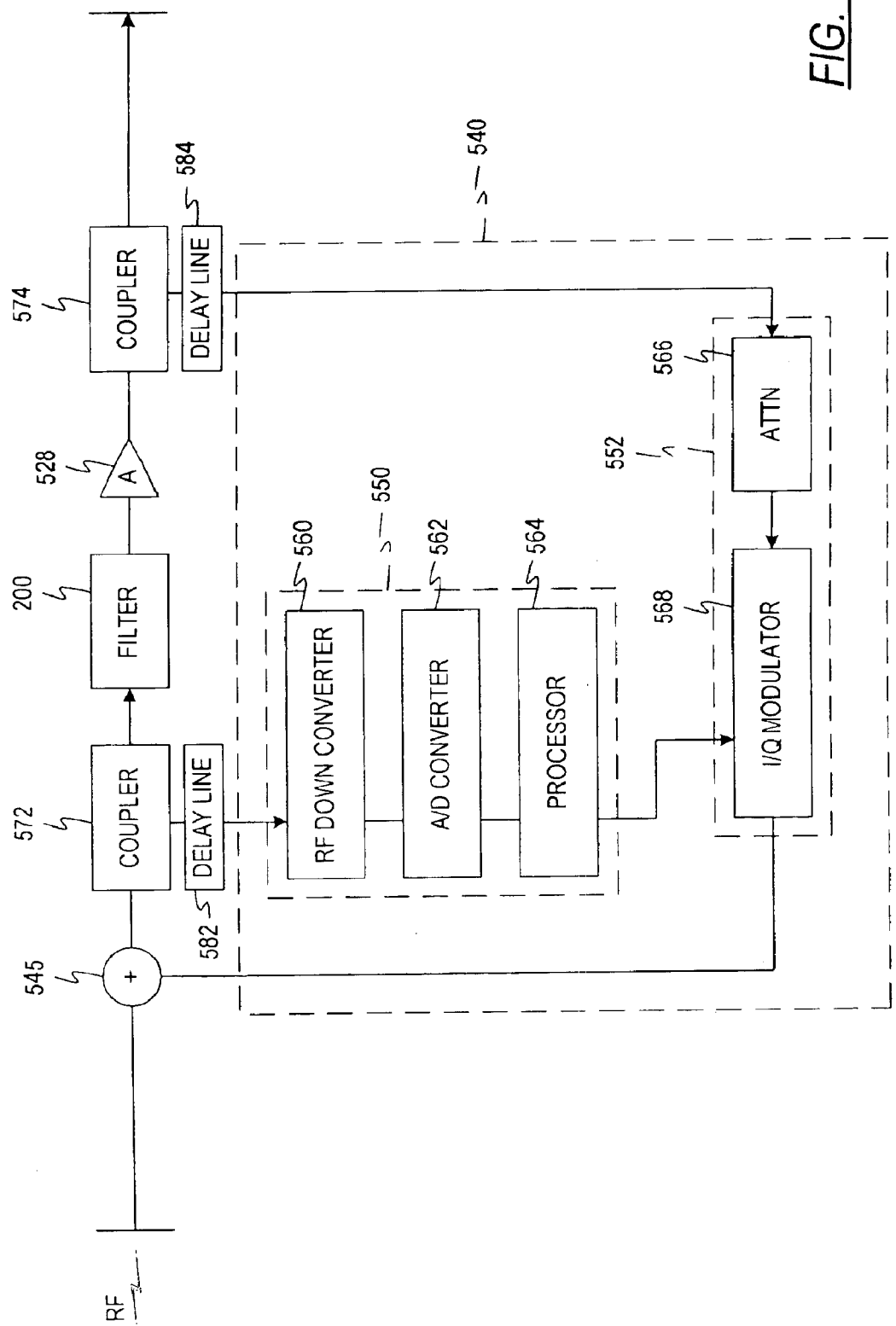
FIG. 13 is a block diagram (high level) of the (digitally) adaptive cancellation circuit of FIG. 7 which shows the technique in further detail.

FIG. 13 shows the circuit 540 in further detail. The DSP 550 is a combination of an RF downconverter 560 to shift the signal to an intermediate frequency that allows digital sampling, an analog-to-digital (A/D) converter 562 which digitizes the analog signal, and a processor 564 which performs the required operations to compute the intermediate signal. The modulator 552 is a combination of a controllable attenuator 566, and an I/Q modulator 568. Additional details shown in FIG. 13 include respective couplers 572 and 574 which couple the signals from the signal path to and from the adaptive cancellation circuit 540, a first coupler 572 being interposed between the summation junction 545 and the filter 200 and the second coupler 574 being at the output of the power amplifier 528. In addition to the couplers 572 and 574 respective delay lines 582 and 584 may be employed at either end of the RF path, one just prior to the summing junction 545 and one subsequent to the coupler 574.

Figure 15:
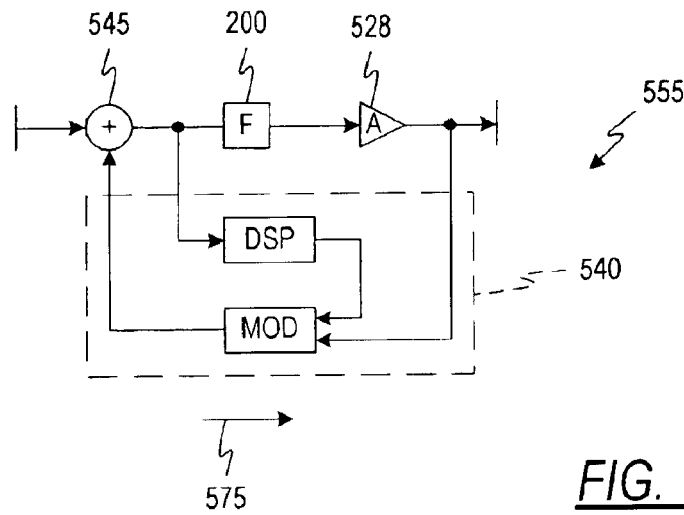
FIGS. 15 and 16 show the directional characteristics of the AC blocks, for the downlink path (FIG. 15) and the uplink path (FIG. 16)
Figure 16:
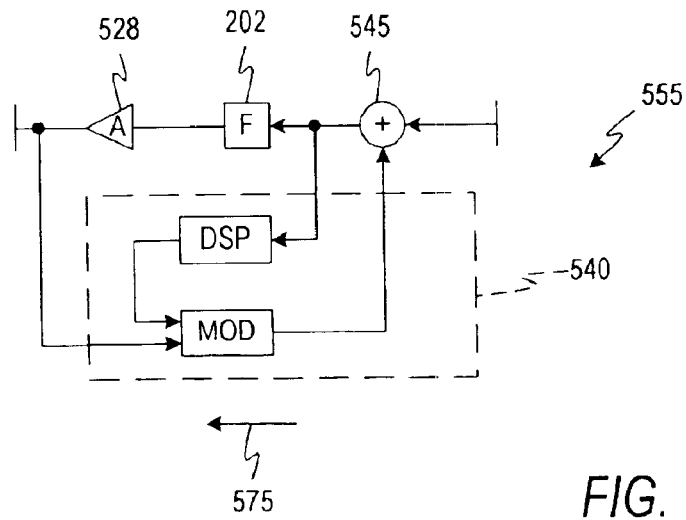

FIG. 14 shows a block diagram of a repeater system similar to that of FIG. 5 using adaptive cancellation (AC) circuit blocks 555, further details of which are shown in FIGS. 15 and 16, as well as in FIGS. 12 and 13. The "direction" of the circuit (AC block) 555 in each RF path has been taken into account. In this system, each (uplink, downlink) path has a separate AC circuit block 555. In FIG. 5, the function of the filters 200, 202 is incorporate in the diplexers 160, 162; in FIGS. 11–18, they are shown separately.

FIGS. 15 and 16 show the directional characteristics of the AC circuit blocks 555, whether for the downlink or uplink path. The blocks are "mirror images" of one another, differing by the direction of the desired signal, with the arrows 575 denoting the directionality of each circuit 555, in FIGS. 14, 15 and 16.

Figure 17:
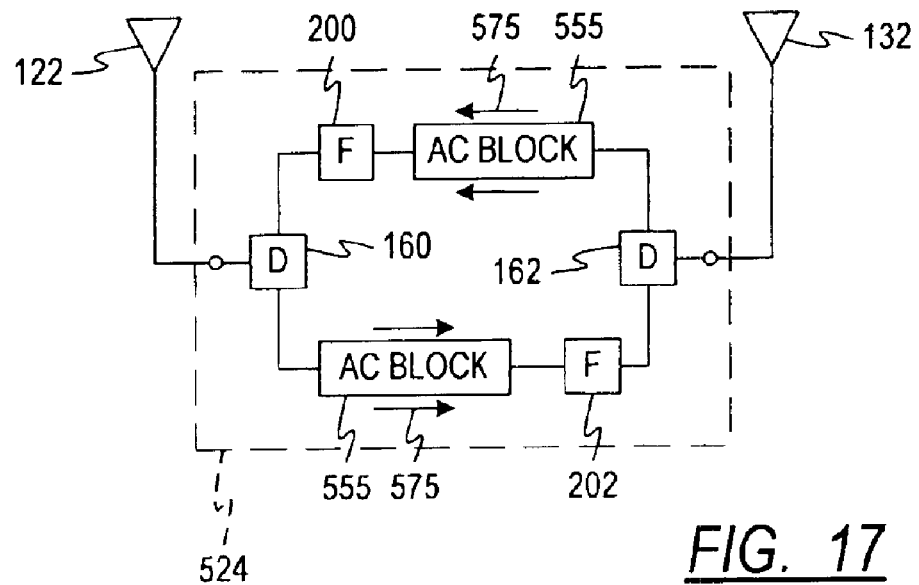
FIG. 17 shows a block diagram of the AC approach of the invention, applied to a repeater system similar to the repeater system of FIG. 6.

FIGS. 14 and 18 show block diagrams of the adaptive cancellation (AC) approach, applied to repeater systems similar to the ones shown and described in FIGS. 5 and 6. As indicated above, FIGS. 14 and 17 show the case for a single antenna unit on each side, including frequency diplexers to separate each path (or frequency band), while FIG. 18 shows the approach when using separate Tx and Rx antennas.

Figure 36:
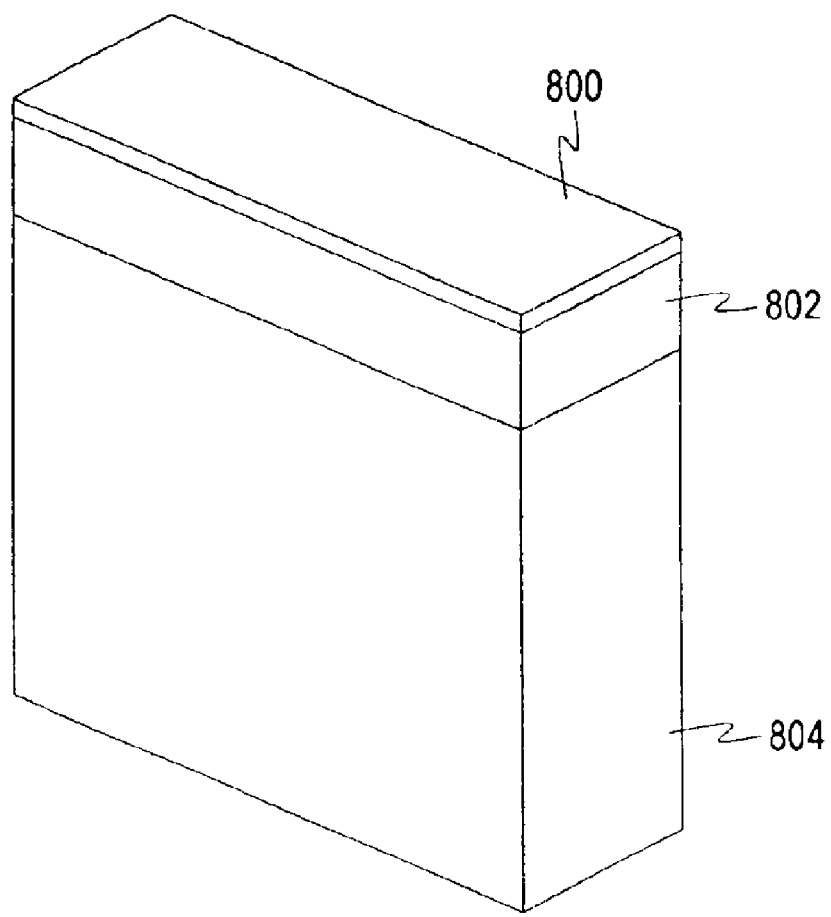
FIG. 36 is a perspective view of a solar-powered battery for a repeater.

FIG. 36 shows a solar panel 800 with a battery 802 on a relatively thin, flat antenna 804 of the type described above. The addition of a "solar panel with battery" system would allow the repeater to be installed in a location with sunlight, and therefore mitigate the requirements for an external (DC) power source. The system would actually operate from the battery unit, which would occasionally (when the sun is up) get re-charged from the embedded solar panel unit. This would be an excellent application for spot coverage requirements for a repeater, where there is currently not a local power source or wiring. Additionally, it would aid the installation of the unit indoors (assuming sufficient lighting, to recharge the batteries, where there is no local power plug). Lastly, it would likely be more aesthetic, than requiring wire runs to the unit. Note that the solar panel could be on the top, sides, and/or the front face (with a hole for the patch antennas). The Battery system would be inside the unit; adjacent to the RF hardware (amplifiers, etc.).

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An integrated repeater comprising:
   a housing having opposing sides;
   a donor antenna mounted closely adjacent to one of the opposing sides of said housing;
   a null antenna mounted closely adjacent to the other of said opposing sides of said housing;
   repeater electronics mounted in said housing and operatively interconnecting said donor antenna and said null antenna; and
   a beamforming arrangement for creating a desired antenna pattern of said donor antenna and a desired antenna pattern of said null antenna.

2. The integrated repeater of claim 1 wherein said repeater electronics further include a downlink channel module and an uplink channel module operatively coupled between said donor and null antennas.

3. The integrated repeater of claim 1 wherein said donor antenna and said null antenna each comprise an antenna array having a plurality of antenna elements and wherein said beamforming arrangement includes a Butler matrix comprising a part of said repeater electronics and operatively coupled with each of said donor antenna array and said null antenna array.

4. The integrated repeater of claim 1 wherein said donor antenna and said null antenna each include separate transmit and receive antenna arrays.

5. The integrated repeater of claim 1 wherein each of said donor and null antennas comprise an antenna array comprising a plurality of patch antenna elements arranged in an M by N array.

6. The integrated repeater of claim 5 wherein said donor antenna and said null antenna each include separate transmit and received antenna arrays.

7. The integrated repeater of claim 5 wherein each of said patch antenila elements comprises a reduced surface wave element.

8. The integrated repeater of claim 1 wherein said donor antenna and said null antenna each comprise an antenna array having a plurality of antenna elements and wherein said beamforming arrangement includes a plurality of stripline feeds of varying lengths coupled with said antenna elements and a switching circuit for selecting one or more of said striplines to achieve a desired stripline delay.

9. The integrated repeater of claim 1 wherein said repeater electronics further include an interference cancellation circuit for substantially cancelling radio frequency interference feedback signals between said donor and null antennas in both an uplink path and a downlink path.

10. The integrated repeater of claim 9 wherein said beamforming arrangement comprises a Butler matrix comprising a part of said repeater electronics and operatively coupled with each of said donor antenna and said null ahtenna and wherein said repeater electronics further include a memory for storing angle and elevation information for use in operating said Butler matrix.

11. The integrated repeater of claim 10 wherein said repeater electronics include amplifiers coupled intermediate said donor antenna and said null antenna and a controller which uses said memory for setting an amplifier gain of said amplifiers.

12. The integrated repeater of claim 1 wherein said repeater electronics further include a controller for providing setup, communications and monitoring functions for the repeater.

13. The integrated repeater of claim 9 wherein said repeater electronics further include a controller for providing setup, communications and monitoring functions for the repeater.

14. The integrated repeater of claim 1 wherein said donor antenna and said null antenna each comprise an antenna array having a plurality of antenna elements, wherein said beamforming arrangement comprises a Butler matrix comprising a part of said repeater electronics and operatively coupled with each of said donor antenna and said null antenna, and further including a memory for storing angle and elevation information for use in operating said Butler matrix.

15. The integrated repeater of claim 14 wherein said repeater electronics include amplifiers coupled intermediate said donor antenna and said null antenna and further including a controller for setting an amplifier gain of said amplifiers, using information stored in said memory.

16. The integrated repeater of claim 1 wherein said donor antenna and said null antenna each comprise an antenna array having a plurality of antenna elements and wherein said beamforming arrangement includes a plurality of phase shifters respectively coupled with the antenna elements and each of said donor antenna array and said null antenna array, a controller for controlling operation of said phase shifting elements, and said phase shifting elements being coupled with a corporate feed to a radio frequency output.

17. The integrated repeater of claim 1 wherein said donor antenna and said null antenna each comprise an antenna array having a plurality of antenna elements and wherein said beamforming arrangement comprises a plurality of striplines, each having a length adjusted for variable stripline delay, coupled respectively with the antennas elements of the donor antenna array and null antenna array and a plurality of RF switches coupled with said striplines.

18. The integrated repeater of claim 1 wherein said donor antenna and said null antenna are mounted upon said opposing sides of said housing.

19. The integrated repeater of claim 1 wherein said donor antenna and said null antenna each comprise a flat panel and said beamforming arrangement comprising a mounting structure for mounting each of each flat panels on one side of said housing for rotational movement relative to said housing.

20. The integrated repeater of claim 19 wherein said donor antenna and said null antenna each comprise a relatively flat antenna face having one or more antenna elements mounted thereon and a peripheral edge surface, and a plurality of radio frequency chokes surrounding said peripheral edge surface.

21. The integrated repeater of claim 20 and further including a quantity of radio frequency absorbent material between at least some of said chokes and on each said antenna face.

22. The integrated repeater of claim 1 wherein said donor antenna and said null antenna each comprise a relatively flat antenna face having one or more antenna elements mounted thereon and a quantity of radio frequency absorbent material on each said antenna face.

23. The integrated repeater of claim 1 wherein said donor antenna and said null antenna each comprise a relatively flat antenna face having one or more antenna elements mounted thereon and a plurality of radio frequency chokes surrounding said antenna face.

24. The integrated repeater of claim 1 wherein said donor antenna and said null antenna each comprise a relatively flat antenna face having one or more antenna elements mounted thereon each of said antennas defining a peripheral edge surface, and a plurality of radio frequency chokes surrounding said peripheral edge surface.

25. The integrated repeater of claim 24 and further including a quantity of radio frequency absorbent material between at least some of said chokes.

26. The integrated repeater of claim 24 and further including a quantity of radio frequency absorbent material on each said antenna face.

27. The integrated repeater of claim 24 and further including a quantity of radio frequency absorbent material between said chokes.

28. The integrated repeater of claim 1 wherein said donor antenna and said null antenna each comprise a relatively flat antenna face having one or more antenna elements mounted thereon and a quantity of radio frequency absorbent material on each said antenna face.

29. The integrated repeater of claim 1 wherein said donor antenna and said null antenna each comprise a relatively flat antenna face having one or more antenna elements mounted thereon and a plurality of radio frequency chokes surrounding said antenna face.

30. The integrated repeater of claim 1 wherein said donor antenna and said null antenna each comprise a relatively flat antenna face having one or more antenna elements mounted thereon and a peripheral edge surface, and a plurality of radio frequency chokes surrounding said peripheral edge surface.

31. The integrated repeater of claim 1 wherein the donor antenna and null antennas are orthogonally polarized.

32. The integrated repeater of claim 1 and further including a solar powered battery mounted to said housing.

33. An integrated repeater comprising:
a housing having opposing sides;
a donor antenna mounted closely adjacent to one of the opposing sides of said housing;
a null antenna mounted closely adjacent to the other of said opposing sides of said housing;
repeater electronics mounted in said housing and operatively interconnecting said donor antenna and said null antenna; and
said repeater electronics including an interference cancellation circuit for cancelling interference feedback signals between said donor antenna and said null antenna in both an uplink path and a downlink antenna.

34. The integrated repeater of claim 33 wherein said repeater electronics further include a downlink channel module and an uplink channel module operatively coupled between said donor and null antennas.

35. The integrated repeater of claim 33 wherein said donor antenna and said null antenna each include separate transmit and receive repeater arrays.

36. The integrated repeater of claim 33 wherein each of said donor and null antennas comprise an antenna array comprising a plurality of patch antenna elements arranged in a an M by N array.

37. The integrated repeater of claim 36 wherein said donor antenna and said null antenna each include separate transmit and receive antenna arrays.

38. The integrated repeater of claim 36 wherein each of said patch antenna elements comprises a reduced surface wave element.

39. The integrated repeater of claim 33 wherein said donor antenna and said null antenna each comprise an antenna array having a plurality of antenna elements and wherein said beamforming arrangement includes a plurality of stripline feeds of varying lengths coupled with said antenna elements and a switching circuit for selecting said striplines to achieve a desired stripline delay.

40. The integrated repeater of claim 33 and further including a means for creating a desired antenna pattern of said donor antenna relative to a base station and a desired antenna pattern of said null antenna relative to subscriber equipment.

41. The integrated repeater of claim 40 wherein said donor antenna and said null antenna each comprise an antenna array having a plurality of antenna elements, and wherein said beamforming means includes a Butler matrix comprising part of said repeater electronics and operatively coupled with each of said donor antenna array and said null antenna array.

42. The integrated repeater of claim 40 wherein said donor antenna and said null antenna each comprise an antenna array having a plurality of antenna elements and wherein said beamforming means includes a plurality of phase shifters respectively coupled with the antenna elements in each of said donor antenna array and said null antenna array, for controller for controlling operation of said phase shifting elements, and said phase shifting elements being coupled with a corporate feed to a radio frequency output.

43. The integrated repeater of claim 40 wherein said donor antenna and said null antenna each comprise an antenna array having a plurality of antenna elements and wherein said beamforming means comprises a plurality of striplines having length adjusted for variable stripline delay and coupled respectively with the antennas elements of the donor antenna array and null antenna array and a plurality of RF switches coupled with said striplines.

44. The integrated repeater of claim 40 wherein said repeater electronics further include a controller for providing setup, communications and monitoring functions for the repeater.

45. The integrated repeater of claim 44 wherein said donor antenna and said null antenna each comprise an antenna array having a plurality of antenna elements, wherein said beamforming means comprises a Butler matrix comprising part of said repeater electronics and operatively coupled with each of said donor antenna array and said null antenna array, and further including a memory for storing angle and elevation information for use in operating said Butler matrix.

46. The integrated repeater of claim 45 wherein said repeater electronics include amplifiers coupled intermediate said donor antenna and said null antenna and further including a controller for setting an amplifier gain of said amplifiers, using information stored in said memory.

47. The integrated repeater of claim 40 wherein said donor antenna and said null antenna are mounted upon said opposing sides of said housing.

48. The integrated repeater of claim 40 wherein each of said donor antenna and said null antenna each comprise flat panels and wherein said beamforming means comprises a mounting structure for mounting each of said flat panels on one side of said housing.

49. The integrated repeater of claim 33 wherein said repeater electronics further include a controller for providing setup, communications and monitoring functions for the repeater.

50. The integrated repeater of claim 33 wherein said interference cancellation circuit comprises an adaptive cancellation circuit which generates a cancellation signal, which when added to a radio frequency signal substantially cancels any feedback signal present in said radio frequency signal.

51. The integrated repeater of claim 50 wherein said adaptive cancellation circuit comprises a digital signal processor circuit which receives an incoming radio frequency signal having a feedback signal component, and which digitally samples and processes said incoming radio frequency signal to generate an intermediate frequency signal, and a modulator circuit which receives said intermediate frequency signal and a sample of a radio frequency output signal and generates said cancellation signal.

52. The integrated repeater of claim 51 wherein said digital signal processor comprises a radio frequency downconverter which converts said incoming radio frequency signal to a lower frequency signal for digital sampling, an analog-to-digital converter coupled to the radio frequency downconverter, which analog-to-digital converter digitizes said lower frequency signal, and a processor coupled to the analog-to- digital converter which computes a desired intermediate frequency signal for the modulator.

53. The integrated repeater of claim 52 wherein said modulator circuit comprises a controllable attenuator which receives and attenuates the radio frequency output signal and an L/Q modulator coupled to said attenuator and to said processor.

54. The integrated repeater of claim 51 wherein said adaptive cancellation circuit further includes a summing junction which receives and sums said intermediate frequency signal and said incoming radio frequency signal.

55. The integrated repeater of claim 54 wherein said digital signal processor circuit receives an output of said summing junction.

56. The integrated repeater of claim 33 wherein said donor antenna and said null antenna each comprise a relatively flat antenna face having one or more antenna elements mounted thereon and a quantity of radio frequency absorbent material surround each said antenna face.

57. The integrated repeater of claim 56 and further including a plurality of radio frequency chokes surrounding said antenna face.

58. The integrated repeater of claim 33 wherein said donor antenna and said null antenna each comprise a relatively flat antenna face having one or more antenna elements mounted thereon and a plurality of radio frequency chokes surrounding said antenna face.

59. The integrated repeater of claim 33 wherein said donor antenna and said null antenna each comprise a relatively flat antenna face having one or more antenna elements mounted thereon, and a peripheral edge surface, and a plurality of radio frequency chokes surrounding said peripheral edge surface.

60. The integrated repeater of claim 59 and further including a quantity of radio frequency absorbent material between at least some of said chokes.

61. The integrated repeater of claim 33 wherein the donor antenna and null antennas are orthogonally polarized.

62. The integrated repeater of claim 33 and further including a solar powered battery mounted to said housing.

63. A method of repeating a radio frequency signal comprising:

receiving said radio frequency signal at one of a donor antenna mounted on one of opposing sides of a housing and a null antenna mounted on the other of said opposing sides of said housing;

routing said signal through repeater electronics mounted in said housing and operatively interconnecting said donor antenna and said null antenna;

transmitting said radio frequency signal from the other of said donor and null antennas; and beamforming for a desired antenna pattern of said donor antenna and a desired antenna pattern of said null antenna, wherein said beamforming comprises selecting the lengths of a plurality of striplines coupled respectively with the antennas elements of the donor antenna array and null antenna array for variable stripline delay and RF switching said striplines.

64. The method of claim 63 further including cancelling radio frequency interference feedback signals between said donor and null antennas in both an uplink path and a downlink path.

65. The method of claim 64 further including providing setup, communications and monitoring functions for the repeater.

66. The method of claim 64 further including storing angle and elevation information for use in beamforming.

67. The method of claim 66 further including setting an amplifier gain of amplifiers coupled intermediate said donor antenna and said null antenna.

68. The method of claim 63 and further including providing setup, communication and monitoring functions for the repeater.

69. The method of claim 63 further including storing angle and elevation information for use in said beamforming.

70. The method of claim 63 further including setting an amplifier gain of amplifiers coupled intermediate said donor antenna and said null antenna.

71. The method of claim 63 wherein said beamforming includes phase shifting antenna elements in a donor antenna array and a null antenna array using a controller and coupling phase shifted signals via a corporate feed to a radio frequency output.

72. The method of claim 63 wherein said beamforming comprises rotating said donor antenna and said null antenna.

73. A method of repeating a radio frequency signal comprising:
   receiving said radio frequency signal at one of a donor antenna mounted on one of opposing sides of a housing and a null antenna mounted on the other of said opposing sides of said housing;
   routing said signal through repeater electronics mounted in said housing operatively interconnecting said donor antenna and said null antenna;
   transmitting said radio frequency signal from the other of said donor and null antennas; and
   cancelling interference feedback signals between said donor antenna and said null antenna in both an uplink path and a downlink path.

74. The method of claim 73 and further including beamforming for creating a desired antenna pattern of said donor antenna and a desired antenna pattern of said null antenna.

75. The method of claim 73 wherein said cancelling interference feedback signals comprises generating a cancellation signal, which when added to a radio frequency signal substantially cancels any feedback signal present in said radio frequency signal.

76. The method of claim 75 wherein said generating comprises digitally sampling and processing an incoming radio frequency signal having a feedback signal component to generate an intermediate frequency signal, and processing said intermediate frequency signal and a sample of a radio frequency output signal to generate said cancellation signal.

77. The method of claim 76 wherein said processing comprises converting said incoming radio frequency signal to a lower frequency signal for digital sampling, digitizing said lower frequency signal, and computing a desired intermediate frequency signal for the modulator.

78. The method of claim 76 further including summing said intermediate frequency signal and said incoming radio frequency signal.

79. The method of claim 76 wherein said processing comprises controllably attenuating the radio frequency output signal sample and JIQ modulating the attenuating signal sample.

80. A method of repeating a radio frequency signal comprising:
   receiving said radio frequency signal to one of a donor antenna mounted on one of opposing sides of a housing and a null antenna mounted on the other of said opposing sides of said housing, wherein said donor antenna and said null antenna each comprise an antenna array having a plurality of antenna elements;
   routing said signal through repeater electronics mounted in said housing and operatively interconnecting said donor antenna and said null antenna;
   transmitting said radio frequency signal from the other of said donor and null antennas; and
   beamforming for a desired antenna pattern of said donor antenna and a desired antenna pattern of said null antenna, wherein said beamforming comprises operating a Butler matrix comprising a part of said repeater electronics and operatively coupled with each of said donor antenna and said null antenna based upon angle and elevation information stored in a memory.

81. A method of repeating a radio frequency signal comprising:
   receiving said radio frequency signal at one of a donor antenna mounted on one of opposing sides of a housing and a null antenna mounted on the other of said opposing sides of said housing, wherein said donor antenna and said null antenna each comprise a relatively flat antenna face having one or more antenna elements mounted thereon;
   routing said signal through repeater electronics mounted in said housing and operatively interconnecting said donor antenna and said null antenna;
   transmitting said radio frequency signal from the other of said donor and null antennas;
   beamforming for a desired antenna pattern of said donor antenna and a desired antenna pattern of said null antenna; and
   reducing coupling between said donor antenna and said null antenna using a plurality of radio frequency chokes surrounding said antenna face of each of said donor antenna and said null antenna.

82. A method of repeating a radio frequency signal comprising:
   receiving said radio frequency signal at one of a donor antenna mounted on one of opposing sides of a housing and a null antenna mounted on the other of said opposing sides of said housing, wherein said donor antenna and said null antenna each comprise a relatively flat antenna face having one or more antenna elements mounted thereon;
   routing said signal through repeater electronics mounted in said housing and operatively interconnecting said donor antenna and said null antenna;
   transmitting said radio frequency signal from the other of said donor and null antennas;
   beamforming for a desired antenna pattern of said donor antenna and a desired antenna pattern of said null antenna; and
   reducing coupling between said donor antenna and said null antenna using a plurality of radio frequency chokes surrounding a peripheral edge surface defined by each of said donor antenna and said null antenna.

* * * * *

UNITED STATES PATENT AND TRADEMARK OFFICE
CERTIFICATE OF CORRECTION

| | | |
|---|---|---|
| PATENT NO. | : 6,934,511 B1 | |
| APPLICATION NO. | : 09/694225 | |
| DATED | : August 23, 2005 | |
| INVENTOR(S) | : Breck W. Lovinggood, Mano D. Judd, and William P. Kuiper | |

It is certified that error appears in the above-identified patent and that said Letters Patent is hereby corrected as shown below:

Column 1, lines 3-4 read "CROSS-REFERENCE TO RELATED APPLICATION" and should read -- CROSS-REFERENCE TO RELATED APPLICATIONS --.

Column 1, line 48 reads "...manufactures are under constant pressure from customers..." and should read -- ...manufacturers are under constant pressure from customers ... --.

Column 2, lines 39-40 read "...plurality of antenna elements, and said repeater electronics an including an interference cancellation circuit for..." and should read -- ...plurality of antenna elements, and said repeater electronics including an interference cancellation circuit for ... --.

Column 3, line 13 reads "FIG. 14 is a block diagram of a repeater system/similar to..." and should read -- FIG. 14 is a block diagram of a repeater system similar to... --.

Column 4, line 9 reads "...repeater electronics 25 which is mounted elsewhere on the..." and should read -- ...repeater electronics 25 which are mounted elsewhere on the... --.

Column 4, line 63 reads "...approach required that the filters 160, 162, provide all of the.. ." and should read -- ...approach required that the filters 160, 162 provide all of the ... --.

Column 6, lines 66-67 read "...angles and elevations can then be used to create with desired beam. In FIG. 20, the antennas 600 in an N by N (e.g., 3 by..." and should read -- ...angles and elevations can then be used to create the desired beam. In FIG. 20, the antennas 600 in an N by N (e.g., 3 by... --.

Column 7, line 20 reads ". . 122$a$ may mount a plurality / elements 600 which may be ..." and should read -- ...122$a$ may mount a plurality antenna elements 600 which may be ... --.

Column 7, lines 23-24 read "The relatively thin housing 152$a$ may between the two faces or surfaces 122$a$ and 132$a$ may house the electronics." and should read -- The relatively thin housing 152a between the two faces or surfaces 122$a$ and 132$a$ may house the electronics. --.

Column 7, line 41 reads "...FIG. 23, each of the surfaces 122$d$ and 132$d$ may of antenna..." and should read -- ... FIG. 23, each of the surfaces 122$d$ and 132$d$ of antenna... --.

Column 8, line 62 reads "...element, is simply a patch that forces more energy in the..." and should read -- ...element is simply a patch that forces more energy in the... --.

UNITED STATES PATENT AND TRADEMARK OFFICE
CERTIFICATE OF CORRECTION

| | | |
|---|---|---|
| PATENT NO. | : 6,934,511 B1 | |
| APPLICATION NO. | : 09/694225 | |
| DATED | : August 23, 2005 | |
| INVENTOR(S) | : Breck W. Lovinggood, Mano D. Judd, and William P. Kuiper | |

It is certified that error appears in the above-identified patent and that said Letters Patent is hereby corrected as shown below:

Column 9, line 30 reads "...between the patches on opposites sides, and allows one to..." and should read --...between the patches on opposite sides, and allows one to... --.

Column 9, line 58 reads "...coupled to one terminal a summer 283. All of the lines 288..." and should read -- ...coupled to one terminal of summer 283. All of the lines 288... --.

Column 10, line 21 reads "...canceller to provide additional gain and phase margin, is..." and should read -- ...canceller to provide additional gain and phase margin and is... --.
Column 13, line 31 reads "...5, the function of the filters 200, 202 is incorporate in the..." and should read -- ...5, the function of the filters 200, 202 is incorporated in the... --.

Column 14, CLAIM 7, line 42 reads "...patch antenila elements comprises a reduced surface wave..." and should read --...patch antenna elements comprises a reduced sur face wave…--.

Column 14, CLAIM 10, line 60 reads "...ahtenna and wherein said repeater electronics further include..." and should read --...antenna and wherein said repeater electronics further include…--.

Column 15, CLAIM 17, line 36 reads "...line delay, coupled respectively with the antennas elements..." and should read -- ... line delay, coupled respectively with the antenna elements... --.

Column 15, CLAIM 19, line 43 reads "...antenna and said null antenna each comprise a fiat panel and..." and should read -- ...antenna and said null antenna each comprise a flat panel and... --.

Column 16, CLAIM 24, line 4 reads "...thereon each of said antennas defining a peripheral edge..." and should read -- ...thereon, each of said antennas defining a peripheral edge... --.

Column 16, CLAIMS 28 & 29, lines 16-25: Upon review of the issued patent and the claims therein, it was discovered that the claims 28-29 are duplicative in language to issued claims 22-23 and should have been deleted in prosecution. To address this over sight, please delete issued claims 28-29 in this patent as duplicative. The subject matter of those claims, as reflected in the remaining claims 22-23, is not disclaimed, and claims 22-23 should remain intact as issued.

UNITED STATES PATENT AND TRADEMARK OFFICE
CERTIFICATE OF CORRECTION

| | |
|---|---|
| PATENT NO. | : 6,934,511 B1 |
| APPLICATION NO. | : 09/694225 |
| DATED | : August 23, 2005 |
| INVENTOR(S) | : Breck W. Lovinggood, Mano D. Judd, and William P. Kuiper |

It is certified that error appears in the above-identified patent and that said Letters Patent is hereby corrected as shown below:

Column 16, CLAIM 30, line 27 reads "...antenna and said null antenna each comprise a relatively fiat..." and should read -- ... antenna and said null antenna each comprise a relatively flat... --.

Column 16, CLAIM 33, line 48 reads "...in both an uplink path and a downlink antenna." and should read -- ...in both an uplink path and a downlink path. --.

Column 16, CLAIM 35, line 55 reads "...transmit and receive repeater arrays." and should read -- ...transmit and receive antenna arrays. --.

Column 16, CLAIM 36, line 57 reads "...said donor and null antenna comprise an antenna array..." and should read -- ...said donor and null antenna comprises an antenna array...--.

Column 16, CLAIM 36, lines 58-59 read "...comprising a plurality of patch antenna elements arranged in a an M by N array." and should read -- comprising a plurality of patch antenna elements arranged in an M by N array. --.

Column 17, CLAIM 42, line 22 reads "...antenna array, for controller for controlling operation of said..." and should read -- ... antenna array, a controller for controlling operation of said... --.

Column 17, CLAIM 43, line 30 reads "...and coupled respectively with the antennas elements of the..." and should read -- ...and coupled respectively with the antenna elements of the... --.

Column 18, CLAIM 53, line 19 reads ".,.an L/Q modulator coupled to said attenuator and to said..." and should read -- ... an I/Q modulator coupled to said attenuator and to said... --.

Column 18, CLAIM 56, line 32 reads "...bent material surround each said antenna face." and should read -- ...bent material surrounds each said antenna face. --.

Column 19, CLAIM 63, line 1 reads "...respectively with the antennas elements of the donor..." and should read -- ...respectively with the antenna elements of the donor... --.

Column 19, CLAIM 68, line 16 reads "...viding setup, communication and monitoring functions for..." and should read -- ...viding setup, communications and monitoring functions for... --.

UNITED STATES PATENT AND TRADEMARK OFFICE
CERTIFICATE OF CORRECTION

| | | |
|---|---|---|
| PATENT NO. | : 6,934,511 B1 | |
| APPLICATION NO. | : 09/694225 | |
| DATED | : August 23, 2005 | |
| INVENTOR(S) | : Breck W. Lovinggood, Mano D. Judd, and William P. Kuiper | |

It is certified that error appears in the above-identified patent and that said Letters Patent is hereby corrected as shown below:

Column 19, CLAIM 79, line 66 reads "...put signal sample and JIQ modulating the attenuating signal..." and should read -- ...put signal sample and I/Q modulating the attenuating signal... --.

Column 20, CLAIM 80, line 3 reads "...receiving said radio frequency signal to one of a donor..." and should read -- ...receiving said radio frequency signal at one of a donor... --.

Signed and Sealed this

Fourteenth Day of November, 2006

JON W. DUDAS
*Director of the United States Patent and Trademark Office*